(12) United States Patent
Hyakudai et al.

(10) Patent No.: US 11,960,434 B2
(45) Date of Patent: Apr. 16, 2024

(54) COMMUNICATION DEVICE, COMMUNICATION SYSTEM, AND COMMUNICATION METHOD FOR TRANSMITTING DATA BLOCKS INCLUDING SIGNAL GROUPS CONFORMING TO A SERIAL PERIPHERAL INTERFACE

(71) Applicant: Sony Semiconductor Solutions Corporation, Kanagawa (JP)

(72) Inventors: Toshihisa Hyakudai, San Diego, CA (US); Junya Yamada, Kanagawa (JP); Satoshi Ota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 101 days.

(21) Appl. No.: 17/713,534

(22) Filed: Apr. 5, 2022

(65) Prior Publication Data
US 2022/0327089 A1    Oct. 13, 2022

Related U.S. Application Data

(60) Provisional application No. 63/171,745, filed on Apr. 7, 2021.

(51) Int. Cl.
*G06F 13/42* (2006.01)
*G06F 1/12* (2006.01)
(52) U.S. Cl.
CPC ............ *G06F 13/4282* (2013.01); *G06F 1/12* (2013.01)
(58) Field of Classification Search
CPC ............................... G06F 13/4282; G06F 1/12
See application file for complete search history.

(56) References Cited

U.S. PATENT DOCUMENTS

2016/0049894 A1* 2/2016 Burke .................. H02K 11/33
                                                    318/496
2019/0130845 A1* 5/2019 Han ...................... G06F 3/041
(Continued)

FOREIGN PATENT DOCUMENTS

JP     2011039931 A     2/2011
JP     2011-239011 A    11/2011
(Continued)

OTHER PUBLICATIONS

Hobden, Peter et al., Low Cost FPGA Implementation of a SPI over High Speed Optical SerDes, 2018 IEEE International Symposium on Smart Electronic Systems (iSES) (Formerly iNiS), 2018, pp. 146-151 Section II.

*Primary Examiner* — Eric T Oberly
(74) *Attorney, Agent, or Firm* — Michael Best & Friedrich LLP

(57) ABSTRACT

A communication device includes: a communication unit that adds, to a set of data blocks including a serial signal group conforming to SPI transmitted from a master in synchronization with a clock, identification information for identifying the data blocks, and transmits the data blocks to a communication partner device within one frame period of a predetermined communication protocol, or adds, to data blocks each including a part of the serial signal group, identification information for identifying each of the data blocks, and transmits the data blocks to the communication partner device in a plurality of frame periods; and a storage unit that sequentially stores a predetermined number of data blocks transmitted from the master and outputs a data block transmitted from the communication partner device in response to the predetermined number of data blocks from the master and stored, to transmit the data block to the master.

21 Claims, 18 Drawing Sheets

(56) References Cited

U.S. PATENT DOCUMENTS

2022/0123864 A1* 4/2022 Davies .................. H04L 1/22
2022/0398211 A1* 12/2022 Wessling ................ G06F 1/12

FOREIGN PATENT DOCUMENTS

| JP | 2018518083 A | 7/2018 |
| JP | 2018533120 A | 11/2018 |

* cited by examiner

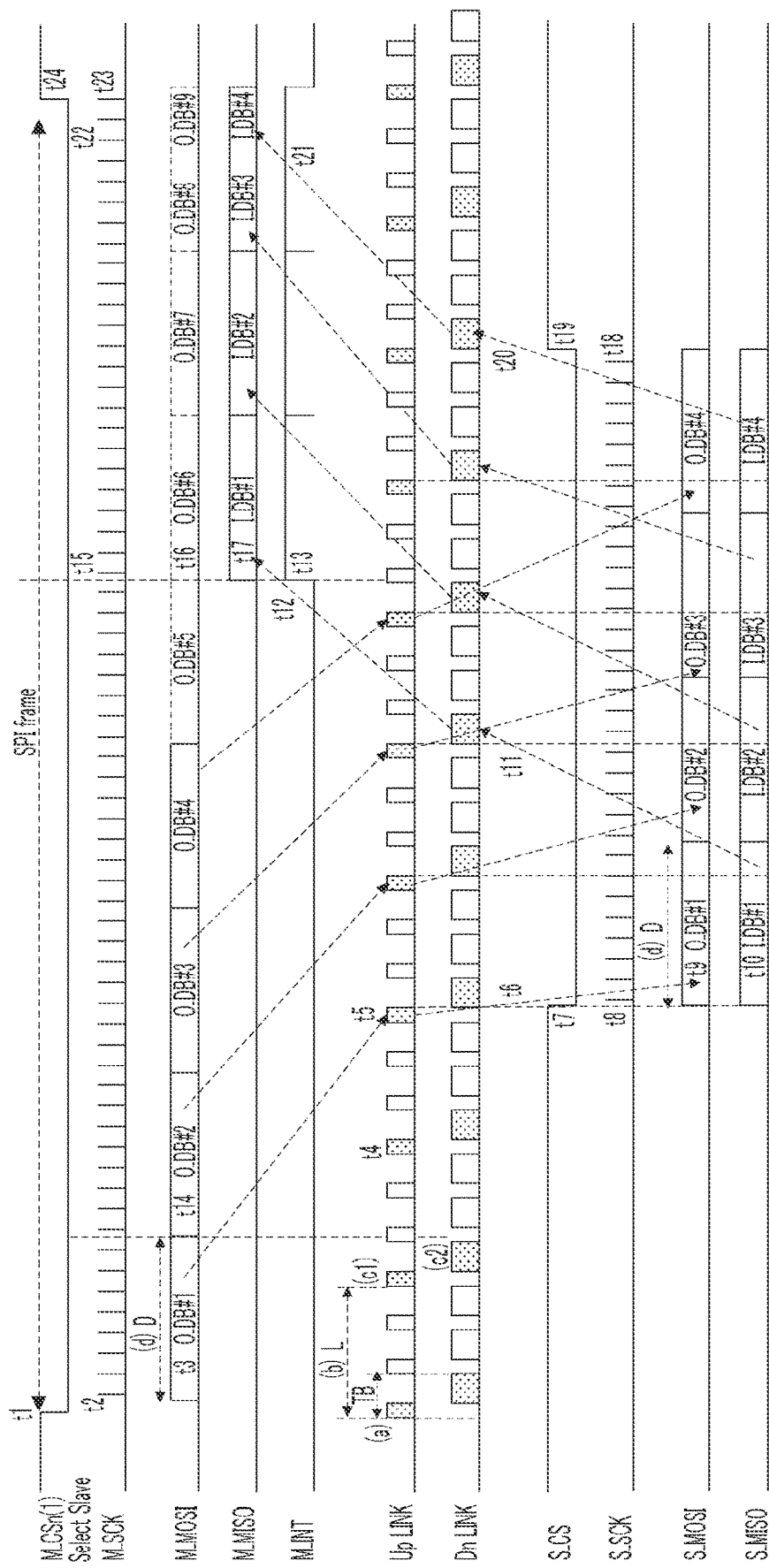

FIG. 10

| No. | NAME | FUNCTION Master→Slave | FUNCTION Slave→Master | | DESCRIPTION |
|---|---|---|---|---|---|
| C-1 | TRANSMISSION MODE | COMMAND | STATE MONITORING | 0 | ALL SPI FRAMES ARE TRANSMITTED WITH ONE TDD BURST |
| | | | | 1 | ONE DB OF SPI FRAME IS TRANSMITTED WITH ONE TDD BURST |
| | | | | OTHERS | RESERVE |
| C-2 | CSn | COMMAND | STATE MONITORING | | Slave IS SELECTED BY Master, NOT ONLY Slave BUT ALSO PLURALITY OF Slaves CAN BE SPECIFIED BY CSn. AND S_SerDes CAN BE SPECIFIED |
| C-3 | SCK FREQUENCY | COMMAND | STATE MONITORING | | SCK FREQUENCY ON Slave SIDE |
| C-4 | SPI MODE | COMMAND | STATE MONITORING | 0 | CPOL=0, CPHA=0 |
| | | | | 1 | CPOL=0, CPHA=1 |
| | | | | 2 | CPOL=1, CPHA=1 |
| | | | | 3 | CPOL=1, CPHA=0 |
| C-5 | TOTAL NUMBER OF DBS | INFORMATION | STATE MONITORING | | Master→Slave: TOTAL NUMBER OF ONE SPI FRAME TOTAL NUMBER=1 IN CASE WHERE TRANSMISSION MODE=1) Slave→Master: NUMBER OF DBS RECEIVED AFTER START OF SPI |
| C-6 | CURRENT DB POSITION | INFORMATION | NA. | 0 | SELECTED IN CASE WHERE TRANSMISSION MODE=0 |
| | | | | 1 | HEAD DB ON SPI FRAME |
| | | | | 2 | OTHER THAN HEAD DB AND FINAL DB |
| | | | | 3 | FINAL DB ON SPI FRAME |
| C-7 | CURRENT DB STATE | INFORMATION | INFORMATION | | 0: dummy, 1: VALID |
| C-8 | DB SIZE | INFORMATION | STATE MONITORING | | TRANSMISSION DATA SIZE (UNIT OF BYTE), 511 BYTES AT MAXIMUM |
| C-9 | Slave INTERRUPTION | NA | INTERRUPT FLAG | | 0: WITHOUT INTERRUPTION, 1: WITH INTERRUPTION |
| C-10 | SLAVE-SIDE OPERATION STATE | NA. | STATE MONITORING | 0 | NORMAL STATE |
| | | | | 1 | BUSY (DCP BUFFER IS EMPTY) |
| | | | | 2 | ERROR (SPI DATA PACKET IS DESTROYED) |
| | | | | OTHERS | RESERVE |
| C-11 | SPI BLOCK RESET | COMMAND | | | 0, —, 1: COMMAND OF SPI BLOCK OF S_SerDes IS RESET |
| C-12 | CURRENT DB NUMBER | INFORMATION | INFORMATION | | Master→Slave: M_SerDes ASSIGNS ID TO EACH PACK Slave→Master: S_SerDes ASSIGNS SAME ID AS PACKET ID FROM M_SerDes TO EACH PACKET |
| D-1 | DATA | MOSI DATA | MISO DATA | | SPI DATA |
| E-1 | CRC | CRC | CRC | | CRC PARITY |

COMMUNICATION DEVICE, COMMUNICATION SYSTEM, AND COMMUNICATION METHOD FOR TRANSMITTING DATA BLOCKS INCLUDING SIGNAL GROUPS CONFORMING TO A SERIAL PERIPHERAL INTERFACE

CROSS REFERENCE TO RELATED APPLICATIONS

This application claims the benefit of U.S. Priority Patent Application 63/171,745 filed on Apr. 7, 2021, the entire contents of which are incorporated herein by reference.

TECHNICAL FIELD

The present disclosure relates to a communication device, a communication system, and a communication method.

BACKGROUND ART

A technology for performing high-speed serial communication between a master serializer/deserializer (SerDes) and a slave SerDes has been proposed (see PTL 1).

In a case where serial communication is performed between two SerDess, for example, a frequency division duplexing (FDD) scheme or a time division duplex (TDD) scheme is used. In a case where there is a large difference between the amount of data transmitted from one SerDes to the other SerDes and the amount of data transmitted from the other SerDes to the one SerDes, it is conceivable to employ the TDD scheme to make a difference in data transmission capacity between uplink and downlink. The TDD scheme is a half-duplex communication scheme in which uplink communication and downlink communication are not performed at the same time, and only one-way communication can be performed.

CITATION LIST

Patent Literature

[PTL 1]
JP 2011-239011 A

SUMMARY

Technical Problem

There is a serial peripheral interface (SPI) which is one of serial communication specifications. The SPI is a full-duplex communication scheme in which uplink communication and downlink communication can be performed at the same time. In SPI communication, generally, an SPI master device (hereinafter, referred to as a master) and an SPI slave device (hereinafter, referred to as a slave) are directly connected to perform data communication. Meanwhile, the SPI communication may be performed between the master and the slave via a serial communication device for long-distance transmission, which is called a SerDes. In such a system, the SPI communication may be performed between the master and a master SerDes, and the SPI communication may be performed between the slave and a slave SerDes, so that serial communication may be performed between the master SerDes and the slave SerDes by the TDD scheme or the FDD scheme. In this case, since it is difficult for the master to grasp whether or not the serial communication between the master SerDes and the slave SerDes has been terminated, for example, a method of transmitting an interrupt signal from the master SerDes to the master to notify the master that the serial communication with the slave SerDes has been completed can be considered.

However, in a case where the interrupt signal is transmitted and received between the master and the master SerDes, it is necessary to provide a pin for the interrupt signal in the master and the master SerDes. In addition, it is necessary to provide an interrupt signal generation circuit inside the master SerDes. In this manner, the interrupt signal may cause a complex hardware configuration.

Therefore, it is desirable to provide a communication device capable of performing serial communication with a simple hardware configuration and a combination of different communication schemes, a communication system, and a communication method.

Solution to Problem

According to an embodiment of the present disclosure, there is provided a communication device including: a communication unit that adds, to a set of data blocks including a serial signal group conforming to a serial peripheral interface (SPI) transmitted from a master in synchronization with a clock, identification information for identifying the data blocks, and transmits the data blocks to a communication partner device within one frame period of a predetermined communication protocol, or adds, to a plurality of data blocks each including a part of the serial signal group, identification information for identifying each of the plurality of data blocks, and transmits the plurality of data blocks to the communication partner device in a plurality of frame periods; and a storage unit that sequentially stores a predetermined number of data blocks transmitted from the master and then outputs a data block transmitted from a slave via the communication partner device in response to the predetermined number of data blocks from the master and stored, to transmit the data block to the master, the predetermined number being one or more.

The predetermined number of data blocks may be transmitted to the communication partner device in the predetermined number of frame periods.

The predetermined number of data blocks may be a predetermined number of continuous data blocks corresponding to information regarding a total number of the data blocks included in the serial signal group transmitted from the master.

The communication device may further include:
a first counter that measures a length of the frame period on the basis of a reference clock shared between the master and the slave; and
a second counter that counts the number of data blocks transmitted from the master,
in which the storage unit may sequentially store the predetermined number of data blocks at a timing corresponding to count values of the first counter and the second counter, and then output the stored data block from the communication partner device.

The reference clock may be a clock of a frequency defined by an Automotive SerDes Alliance (ASA) specification, and the second counter may perform a counting operation in synchronization with a clock included in the serial signal group conforming to the SPI.

A first period which is a cycle in which the predetermined number of data blocks transmitted from the master are stored in the storage unit may be equal to or longer than a second period which is a cycle in which the communication unit transmits a packet including the data block to the communication partner device.

The second period may be longer than a half of the first period.

The communication unit may transmit the data block stored in the storage unit to the communication partner device in the frame period after the second period elapses from when the data block transmitted from the master is stored in the storage unit.

The communication unit may transmit the data block stored in the storage unit to the communication partner device in the frame period before the second period elapses from when the data block transmitted from the master is stored in the storage unit.

In a case where a data block to be transmitted to the communication partner device is not ready, the communication unit may stop transmitting the data block to the communication partner device until a next frame period.

In a case where the data block from the communication partner device does not arrive for the data block from the master, the storage unit may stop storing a new data block until a next frame period.

The communication device may further include a shift register that sequentially stores the predetermined number of data blocks transmitted from the master in the storage unit every first period, and then sequentially reads the data blocks transmitted from the communication partner device and stored in the storage unit every first period from the storage unit and transmits the data blocks to the master.

The shift register may sequentially read the data blocks from the communication partner device stored in the storage unit and transmit the data blocks to the master without transmitting an interrupt signal indicating that a data block from the communication partner device has arrived to the master.

The communication unit may transmit a data block from the master to the communication partner device and receive a data block from the communication partner device in mutually different periods within the frame period by using the communication protocol according to time division duplex (TDD).

According to another embodiment of the present disclosure, there is provided a communication system including:

a first communication device and a second communication device that transmit and receive a packet according to a predetermined communication protocol, in which the first communication device includes:

a first communication unit that adds, to a set of data blocks including a serial signal group conforming to a serial peripheral interface (SPI) transmitted from a master in synchronization with a clock, identification information for identifying the data blocks, and transmits the data blocks to a second communication device within one frame period of the predetermined communication protocol, or adds, to a plurality of data blocks each including a part of the serial signal group, identification information for identifying each of the plurality of data blocks, and transmits the plurality of data blocks to the second communication device in a plurality of frame periods; and a first storage unit that sequentially stores a predetermined number of data blocks transmitted from the master and then stores data blocks transmitted from a slave via the second communication device in response to the predetermined number of data blocks from the master, the predetermined number being one or more, and the second communication device includes a second communication unit that transmits data blocks transmitted from the slave in response to the predetermined number of data blocks transmitted from the first communication unit to the first communication device within at least one frame period.

The first communication device may further include a first shift register that sequentially stores the predetermined number of data blocks transmitted from the master in the first storage unit and then sequentially reads the data blocks transmitted from the second communication device and stored in the first storage unit from the first storage unit and transmits the data blocks to the master, and the second communication device may further include:

a second storage unit that stores the predetermined number of data blocks transmitted from the first communication unit and stores the data blocks transmitted from the slave; and a second shift register that sequentially stores the predetermined number of data blocks transmitted from the first communication unit in the second storage unit, sequentially reads the data blocks transmitted from the slave and stored in the second storage unit from the second storage unit, and transmits the data blocks to the first communication unit via the second communication unit.

The second shift register may stop a shift operation in a case where there are no data block to be stored in the second storage unit and no data block to be transmitted to the first communication unit.

The communication system may further include a clock generator that generates a clock that causes the second shift register to perform the shift operation in a case where the second communication unit receives the data block to be stored in the second storage unit.

The clock may be in synchronization with a serial clock included in the serial signal group conforming to the SPI transmitted from the master to the first communication device.

According to still another embodiment of the present disclosure, there is provided a communication method including:

adding, to a set of data blocks including a serial signal group conforming to a serial peripheral interface (SPI) transmitted from a master in synchronization with a clock, identification information for identifying the data blocks, and transmitting the data blocks to a communication partner device within one frame period of a predetermined communication protocol, or adding, to a plurality of data blocks each including a part of the serial signal group, identification information for identifying each of the plurality of data blocks, and transmitting the plurality of data blocks to the communication partner device in a plurality of frame periods; and sequentially storing, in a storage unit, a predetermined number of data blocks transmitted from the master and then reading a data block transmitted from a slave via the communication partner device in response to the predetermined number of data blocks from the master and stored in the storage unit, to transmit the data block to the master, the predetermined number being one or more.

BRIEF DESCRIPTION OF DRAWINGS

FIG. 7 is a timing chart according to a modified example of FIG. 5.

FIG. 10 is a diagram for describing information included in a transmission packet generated by a packet encoder (ECP) in the M_SerDes and an ECP in an S_SerDes.

DESCRIPTION OF EMBODIMENTS

Hereinafter, embodiments of a communication device, a communication system, and a communication method will be described with reference to the drawings. Although main components of the communication device, the communication system, and the communication method will be mainly described below, the communication device, the communication system, and the communication method may include components and functions that are not illustrated or described. The following description does not exclude components and functions that are not illustrated or described.

(Basic Configuration)

Figure 1:
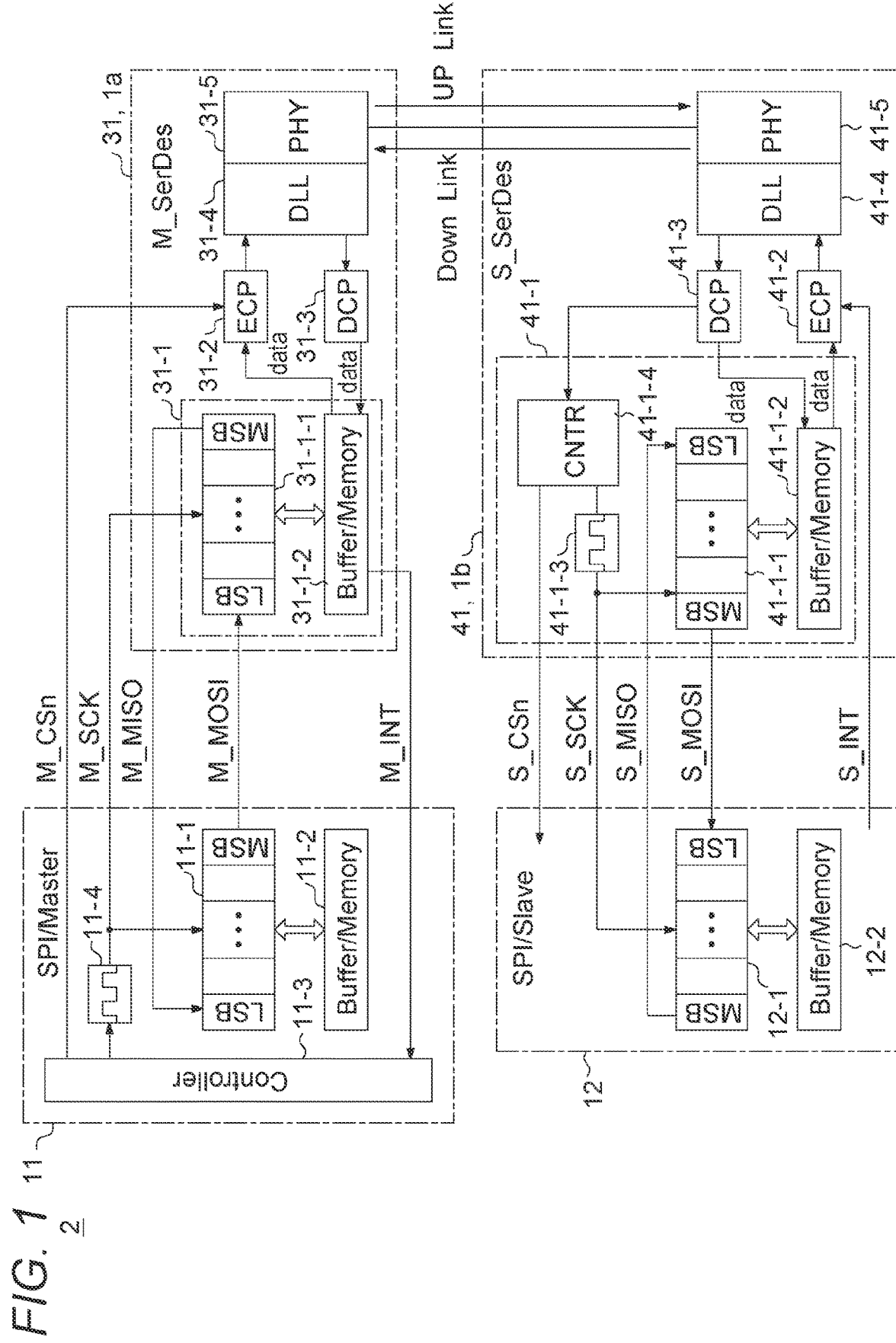
FIG. 1 is a block diagram illustrating a basic configuration of a communication system according to an embodiment of the present disclosure.

FIG. 1 is a block diagram illustrating a basic configuration of a communication system 2 according to an embodiment of the present disclosure. The communication system 2 of FIG. 1 includes a serial peripheral interface (SPI)/Master 11, a master SerDes (M_SerDes 31) 31, an SPI/Slave 12, and a slave SerDes (S_SerDes) 41. Among them, the M_SerDes 31 corresponds to a communication device 1a, and the S_SerDes 41 corresponds to a communication device 1b.

The SPI/Master 11 and the M_SerDes 31 perform serial communication conforming to the SPI (which may also hereinafter be referred to as SPI communication). Similarly, the SPI/Slave 12 and the S_SerDes 41 perform serial communication conforming to the SPI (SPI communication). The M_SerDes 31 and the S_SerDes 41 perform high-speed serial communication by using a time division duplex (TDD) scheme. In FIG. 1, a signal transmission path from the M_SerDes 31 to the S_SerDes 41 is referred to as uplink, and a signal transmission path from the S_SerDes 41 to the M_SerDes 31 is referred to as downlink. In the SPI communication, serial communication is performed according to a protocol (hereinafter, referred to as an SPI protocol) conforming to an SPI specification. Furthermore, in the present specification, serial data transmitted and received through the SPI communication may be referred to as SPI data. The M_SerDes 31 and the S_SerDes 41 perform high-speed serial communication conforming to, for example, an Automotive SerDes Alliance (ASA) specification.

As described later, the M_SerDes 31 includes a communication unit (DLL 31-4) that transmits a serial signal group conforming to a serial peripheral interface (SPI) transmitted from a master (SPI/Master 11) in synchronization with a clock to a communication partner device (S_SerDes 41) as a set of data blocks within one frame period of a predetermined communication protocol, or transmits the serial signal group to the communication partner device (S_SerDes 41) as a plurality of data blocks divided according to a plurality of frame periods. In addition, the S_SerDes 41 includes a communication unit (DLL 41-4) that transmits a serial signal group conforming to an SPI transmitted from a slave (SPI/Slave 12) in synchronization with a clock generated on the basis of clock frequency information included in a packet from a communication partner device (M_SerDes 31) to the communication partner device (M_SerDes 31) as a set of data blocks within one frame period of a predetermined communication protocol or transmits the serial signal group to the communication partner device (M_SerDes 31) as a plurality of data blocks divided according to a plurality of frame periods.

Figure 2:
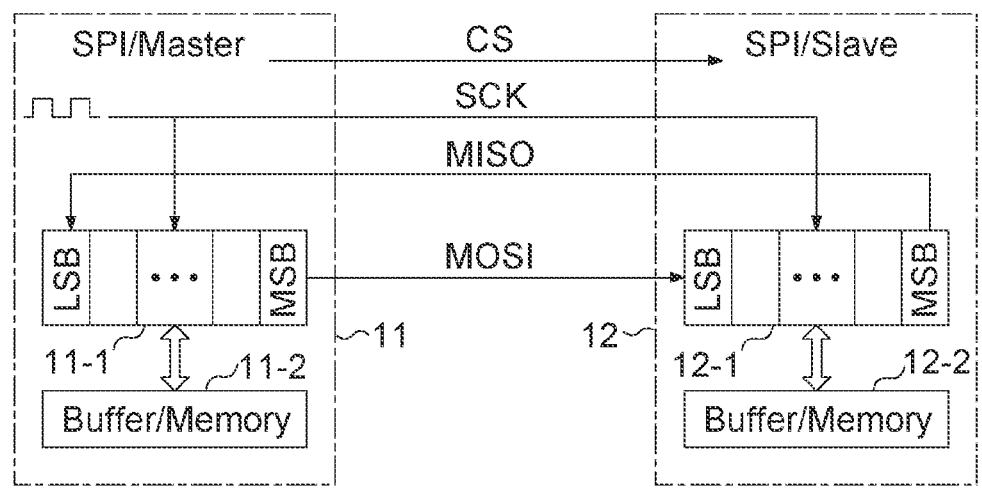
FIG. 2 is a block diagram of a portion related to serial peripheral interface (SPI) communication between an SPI/Master and an SPI/Slave.

FIG. 2 is a block diagram of a portion related to the SPI communication between the SPI/Master 11 and the SPI/Slave 12. Note that FIG. 2 illustrates an example in which the SPI/Master 11 and the SPI/Slave 12 directly perform serial communication conforming to the SPI in order to simplify the description.

As illustrated in FIG. 2, the SPI/Master 11 includes a shift register 11-1 and a buffer/memory 11-2. Similarly, the SPI/Slave 12 includes a shift register 12-1 and a buffer/memory 12-2.

The shift register 12-1 in the SPI/Slave 12 is operated in synchronization with a clock SCK supplied from the SPI/Master 11. The shift register 11-1 in the SPI/Master 11 sequentially outputs serial data from a most significant bit (MSB) side in synchronization with the SCK. The output serial data is input to a least significant bit (LSB) side of the shift register 12-1 in the SPI/Slave 12 via a MOSI pin. The serial data output from the MSB side of the shift register 12-1 in the SPI/Slave 12 is input to the LSB side of the shift register 11-1 in the SPI/Master 11 via a MISO pin. Data held by the shift register 11-1 in the SPI/Master 11 can be stored in the buffer/memory 11-2. In addition, the shift register 11-1 can hold data stored in the buffer/memory 11-2. Similarly, data held by the shift register 12-1 in the SPI/Slave 12 can be stored in the buffer/memory 12-2. In addition, the shift register 12-1 can hold data stored in the buffer/memory 12-2.

FIGS. 3A to 3D are basic signal waveform diagrams of the SPI protocol. In the SPI protocol, there are four combinations of the polarity of the SCK when a slave select signal (CS signal) output by the SPI/Master 11 is idle (a high level in FIGS. 3A to 3D) and an edge (a rising edge or a falling edge) of the clock (SCK) that latches data when the CS signal becomes active (a low level in FIGS. 3A to 3D). These four combinations are called SPI modes. The SPI/Master 11 can arbitrarily select one of the four SPI modes. The SPI/Master 11 knows in advance an SPI mode that can be supported by the SPI/Slave 12, and needs to select a mode corresponding thereto.

FIGS. 3A to 3D are signal waveform diagrams of four SPI modes. In a case where SPI mode=0 illustrated in FIG. 3A, the SCK is low when the CS signal is idle, and data is held when the SCK rises. In a case where SPI mode=1 illustrated in FIG. 3B, the SCK is low when the CS signal is idle, and data is held when the SCK falls. In a case where SPI mode=2 illustrated in FIG. 3C, the SCK is high when the CS signal is idle, and data is held when the SCK rises and falls. In a case where SPI mode=3 illustrated in FIG. 3D, the SCK is high when the CS signal is idle, and data is held when the SCK rises. Since a frequency of the SCK is not defined in the SPI protocol and differs for each individual device that performs the SPI communication, the SPI/Master 11 selects the frequency of the SCK for each individual device that performs the SPI communication. Therefore, the SPI/Master 11 needs to know in advance the frequency of the SCK that can be supported by each device that performs the SPI communication.

Hereinafter, a communication method using the SPI protocol will be described. In the example of FIG. 2, communication according to the SPI protocol is performed between the SPI/Master 11 and the SPI/Slave 12. One or more SPI/Slaves 12 may be connected to the SPI/Master 11. In a case where a plurality of SPI/Slaves 12 is connected to the SPI/Master 11, the SPI/Master 11 has a plurality of CS signals corresponding to the plurality of SPI/Slaves 12, and can select a slave to be communicated with by using the corresponding CS signal to perform communication. The CS signal for the SPI/Master 11 to select the SPI/Slave 12 to be communicated with is included in SPI control information as described later. The SPI/Master 11 includes the SPI control information in the SPI data and transmits the SPI data to the M_SerDes 31.

In a case where the SPI communication is performed, the SPI/Master 11 sets the CS signal connected to the SPI/Slave 12 to be communicated with to be in an active state (low in FIGS. 3A to 3D). In the present specification, setting various signals to an active state may be referred to as assertion, and setting various signals to an idle state may be referred to as deassertion.

The SPI/Master 11 and the SPI/Slave 12 transfer data to be transferred from the respective buffer/memories 11-2 and 12-2 to the shift registers 11-1 and 12-1. The SPI/Master 11 generates and supplies the SCK to the shift register 11-1 thereof, and also supplies the SCK to the shift register 12-1 in the SPI/Slave 12. Each of the shift registers 11-1 and 12-1 shifts the held data by 1 bit by toggling of the SCK. When the SCK toggles by the number of stages of the shift registers 11-1 and 12-1, the data of the shift registers 11-1 and 12-1 are switched. Then, the SPI/Master 11 transitions the CS signal to an idle state (high in FIGS. 3A to 3D). The SPI/Master 11 and the SPI/Slave 12 can acquire data from the buffer/memories 11-2 and 12-2 by transferring the data of the shift registers 11-1 and 12-1 at that time to the buffer/memories 11-2 and 12-2, whereby the SPI communication is terminated.

FIG. 2 illustrates an example in which the SPI/Master 11 and the SPI/Slave 12 directly perform the SPI communication, but in FIG. 1, the M_SerDes 31 and the S_SerDes 41 are arranged between the SPI/Master 11 and the SPI/Slave 12. In FIG. 1, the SPI/Master 11 and the M_SerDes 31 perform the SPI communication, the M_SerDes 31 and the S_SerDes 41 perform serial communication by using the TDD scheme, and the SPI/Slave 12 and the S_SerDes 41 perform the SPI communication.

Figure 4:
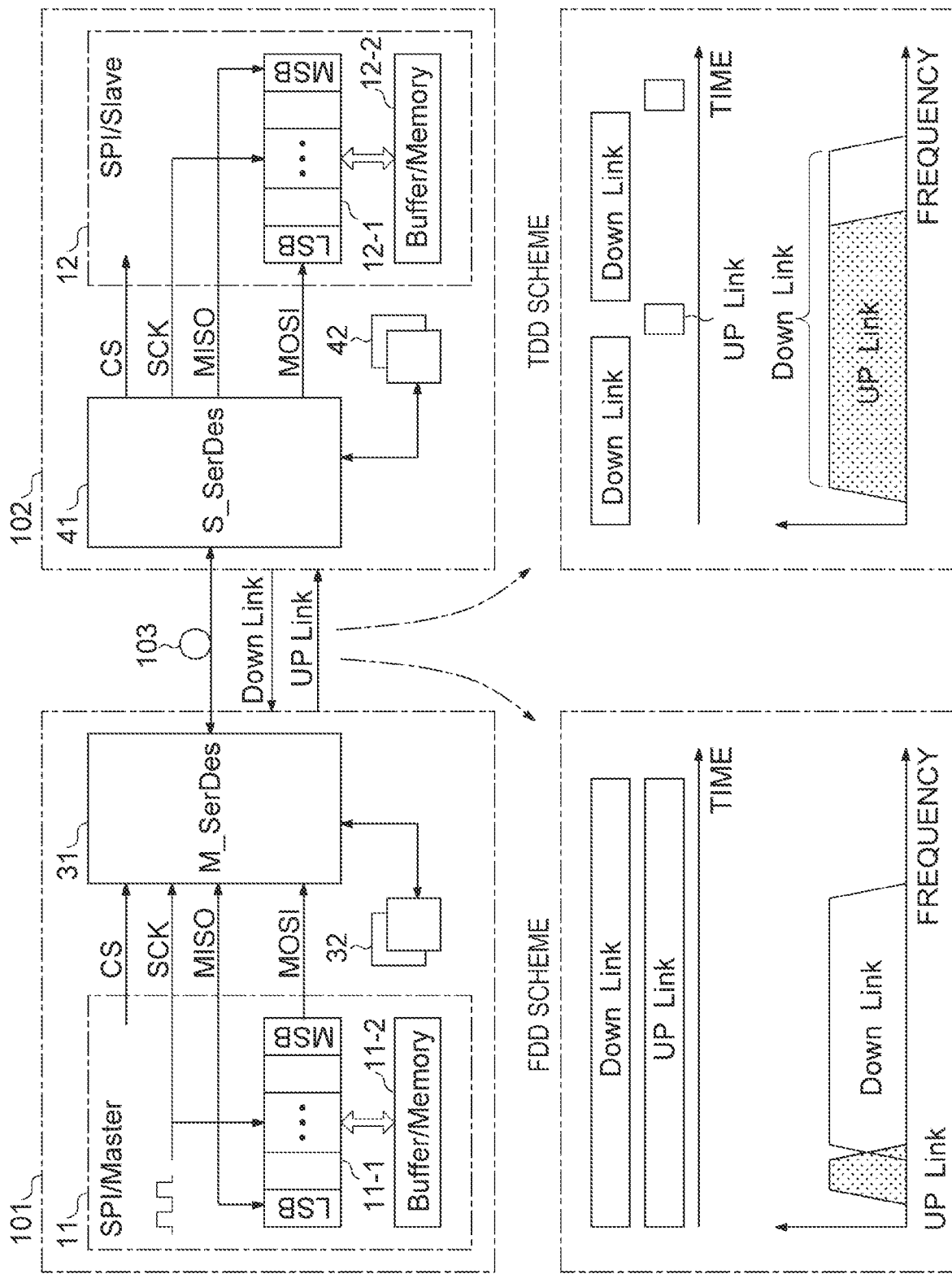
FIG. 4 is a diagram for describing a time division duplex (TDD) scheme used between an M_SerDes and an S_SerDes of FIG. 1.

FIG. 4 is a diagram illustrating the TDD scheme used between the M_SerDes 31 and the S_SerDes 41 of FIG. 1. FIG. 4 illustrates a simplified internal configuration of the SPI/Master 11 and the SPI/Slave 12 illustrated in FIG. 1. Furthermore, FIG. 4 illustrates an example in which peripheral devices 32 and 42 are connected to the M_SerDes 31 and the S_SerDes 41, respectively.

The M_SerDes 31 and the S_SerDes 41 are connected to each other by a cable 103 of several meters to more than 10 meters, for example. Through this cable 103, the M_SerDes 31 and the S_SerDes 41 perform high-speed serial communication. In addition, a plurality of sets each including two devices having configurations similar to those of the M_SerDes 31 and the S_SerDes 41 of FIG. 4 may be provided, and high-speed serial communication may be performed for each set. The M_SerDes 31 and the S_SerDes 41 of FIG. 4 can be widely applied for the use of transmission and reception of a large amount of data, such as an in-vehicle camera module.

The M_SerDes 31 and the S_SerDes 41 perform high-speed serial communication by using the TDD scheme. A timing and a frequency band of the TDD scheme are illustrated on the lower right side of FIG. 4. In the TDD scheme, as illustrated on the right side of FIG. 4, one uplink signal transmission period and one downlink signal transmission period are provided so as not to temporally overlap each other within one TDD cycle. The example of the TDD timing chart of FIG. 4 illustrates an example in which a signal transmission period of an uplink signal (referred to as uplink) from the M_SerDes 31 to the S_SerDes 41 is extremely shorter than a signal transmission period of a downlink signal (referred to as downlink) from the S_SerDes 41 to the M_SerDes 31, that is, an example in which a signal ratio of uplink is extremely smaller than a signal ratio of downlink. For example, in a case where a video signal captured by a sensor in the S_SerDes 41 is transmitted to the M_SerDes 31, the signal ratio is as illustrated in the TDD timing chart of FIG. 4.

On the right side of FIG. 4, a frequency band used for uplink signal transmission and a frequency band used for downlink signal transmission in the TDD scheme are illustrated. As illustrated in the drawing, in the TDD scheme, the frequency band for the uplink signal transmission and the frequency band for the downlink signal transmission partially overlap each other. For example, in a case where a video signal captured by a sensor in the S_SerDes 41 is transmitted to the M_SerDes 31, downlink signal transmission with a large signal amount may require a wider frequency band than that for uplink signal transmission, and thus, the downlink signal transmission is performed using a wider frequency band including the frequency band used for uplink signal transmission. In the TDD scheme, since the downlink signal transmission period does not overlap with the uplink signal transmission period, an echo cancellation circuit for separating both signals is unnecessary.

It is assumed that the M_SerDes 31 and the S_SerDes 41 according to the present embodiment perform signal transmission by using the TDD scheme, but signal transmission may also be performed by using the FDD scheme in some cases. A timing and a frequency band of the FDD scheme are illustrated on the lower left side of FIG. 4. In the FDD scheme, a frequency band used for signal transmission from the M_SerDes 31 to the S_SerDes 41 is different from a frequency band used for signal transmission from the S_SerDes 41 to the M_SerDes 31. Therefore, signal transmission from the M_SerDes 31 to the S_SerDes 41 and signal transmission from the S_SerDes 41 to the M_SerDes 31 can be performed at the same timing, and uplink signal transmission and downlink signal transmission can be performed using the entire period within one FDD cycle.

In addition, in the FDD scheme, uplink signal transmission with a large signal amount is performed using a wide frequency band on a high frequency side. Downlink signal transmission with a small signal amount is performed using a narrow frequency band on a low frequency side. In the example on the lower left side of FIG. 4, in order to increase frequency utilization efficiency, a frequency band used for uplink signal transmission and a frequency band used for downlink signal transmission partially overlap each other. In addition, as illustrated on the lower left side of FIG. 4, an uplink signal transmission section and a downlink signal transmission section in a time domain completely overlap each other. The presence of these overlaps may require the echo cancellation circuit. The echo cancellation circuit is a circuit that accurately separates an uplink signal and a downlink signal.

In a TDD bidirectional communication scheme, unlike FDD bidirectional communication, it is necessary to transmit a signal of a full-duplex communication scheme, in which data is exchanged simultaneously between a master device and an SPI slave device in synchronization with the SCK, to a half-duplex communication scheme in which an uplink signal (uplink) and a downlink signal (downlink) between communication devices perform communication while being switched for each allocated time, and in particular, it is necessary for the SPI master device 11 to know and read that a read signal (MISO in FIGS. 3A to 3D) from the slave side has reached the M_SerDes 41 via the S_SerDes 31 using some means.

In FIG. 4, once read data S_MISO from the SPI/Slave 12 reaches a buffer/memory 31-1-2 in the M_SerDes 31 via the S_SerDes 41 and the cable 103, the buffer/memory 31-1-2 notifies the SPI/Master 11 of the arrival of the read data S_MISO by an interrupt signal M_INT 11-11, and the SPI/Master 11 that has received the notification supplies M_SCK, which is an SPI clock, to the M_SerDes 31, and M MISO data is read from a shift register 31-1-1 in synchronization with M_SCK. However, in this method, the interrupt signal M_INT is necessary, and therefore a dedicated signal pin may be required, which causes an increase in cost.

Hereinafter, an example in which the M_SerDes 31 and the S_SerDes 41 perform high-speed serial communication by using the TDD scheme, the M_SerDes 31 performs serial communication conforming to the SPI with the SPI/Master 11, and the S_SerDes 41 performs serial communication conforming to the SPI with the SPI/Slave 12 will be described.

Since serial communication based on the TDD scheme instead of the SPI is performed between the M_SerDes 31 and the S_SerDes 41, it is necessary to perform protocol conversion inside the M_SerDes 31 and the S_SerDes 41. Further, while serial communication based on the SPI is the full-duplex communication scheme, serial communication based on the TDD scheme is the half-duplex communication scheme, and thus it is difficult to transmit and receive data from the SPI/Master 11 and the SPI Slave by using the TDD scheme at the same timing. Hereinafter, a configuration of the communication system 2 of FIG. 1 will be described in detail. As illustrated in FIG. 4, the SPI/Master 11 of FIG. 1 includes a controller 11-3 and an SCK generator 11-4 in addition to the shift register 11-1 and the buffer/memory 11-2.

The controller 11-3 supplies a slave select signal (CS signal) for activating SPI communication to the M_SerDes 31 via an M_CSn pin. The CS signals are provided as many as the number of devices that perform SPI communication with the SPI/Master 11. For example, in FIG. 1, different M_CSn pins are allocated to the M_SerDes 31, the S_SerDes 41, and the SPI/Slave 12, respectively. In the present specification, a pin that outputs the CS signal output from the SPI/Master 11 may be referred to as M_CSn(x). For example, M_CSn(0) is allocated to the M_SerDes 31, and M_CSn(1) is allocated to the SPI/Slave 12.

The controller 11-3 controls an operation of the SCK generator 11-4. The SCK generator 11-4 outputs the SCK when any CS signal is in an active state. The shift register 11-1 performs a shift operation in synchronization with the SCK.

The controller 11-3 detects that the SPI/Slave 12 has output an interrupt signal S INT by the interrupt signal M_INT from the M_SerDes 31, and starts SPI communication of the next frame with the interrupt signal M_INT as a trigger. Alternatively, in a case where the controller 11-3 itself wants to transmit the SPI data, SPI communication is similarly started (a time t1 of M_CSn(1) in FIG. 5 as described later).

The M_SerDes 31 is connected to the SPI/Master 11. The M_SerDes 31 includes an SPI block 31-1 in order to perform data communication with the SPI/Master 11 according to the SPI protocol. The SPI block 31-1 includes the shift register 31-1-1 and the buffer/memory 31-1-2. Once the controller 11-3 in the SPI/Master 11 activates the CS signal corresponding to the M_SerDes 31 and the SCK generator 11-4 outputs the SCK, the shift register 31-1-1 outputs the SPI data in synchronization with the SCK and supplies the SPI data to the SPI/Master 11 via the MISO pin. In addition, the shift register 31-1-1 fetches the SPI data output from the SPI/Master 11 via the MOSI pin in synchronization with the SCK.

When the CS signal becomes idle, the controller 11-3 causes the SCK generator 11-4 to stop the output of the SCK. As a result, the shift register 31-1-1 holds a state immediately before the SCK is stopped.

Once the CS signal transitions to the idle state, the SPI block 31-1 in the M_SerDes 31 transfers all the data in the shift register 31-1-1 to the buffer/memory 31-1-2. As a result, data transfer processing from the SPI/Master 11 to the M_SerDes 31 according to the SPI protocol is terminated.

Note that data transfer from the shift register 31-1-1 to the buffer/memory 31-1-2 in the M_SerDes 31 depends on the amount of data that the SPI/Master 11 wants to transfer and a data capacity of the shift register 31-1-1. Therefore, in a case where there is a possibility that the data in the shift register 31-1-1 overflows while the CS signal is in the active state, data missing can be prevented by transferring the data in the shift register 31-1-1 to the buffer/memory 31-1-2 before the overflowing.

In addition, the M_SerDes 31 includes a packet encoder (ECP) 31-2, a packet decoder (DCP) 31-3, the DLL 31-4, and a PHY layer block (PHY) 31-5. The ECP 31-2 in the M_SerDes 31 converts the SPI data stored in the buffer/memory 31-1-2 into a packet (SPI packet) conforming to the TDD scheme. The DLL 31-4 combines the SPI packet generated by the ECP 31-2 with other transmission packets other than the SPI packet to generate an uplink packet. The PHY 31-5 transmits the uplink packet to the S_SerDes 41 via the uplink.

Figure 5:
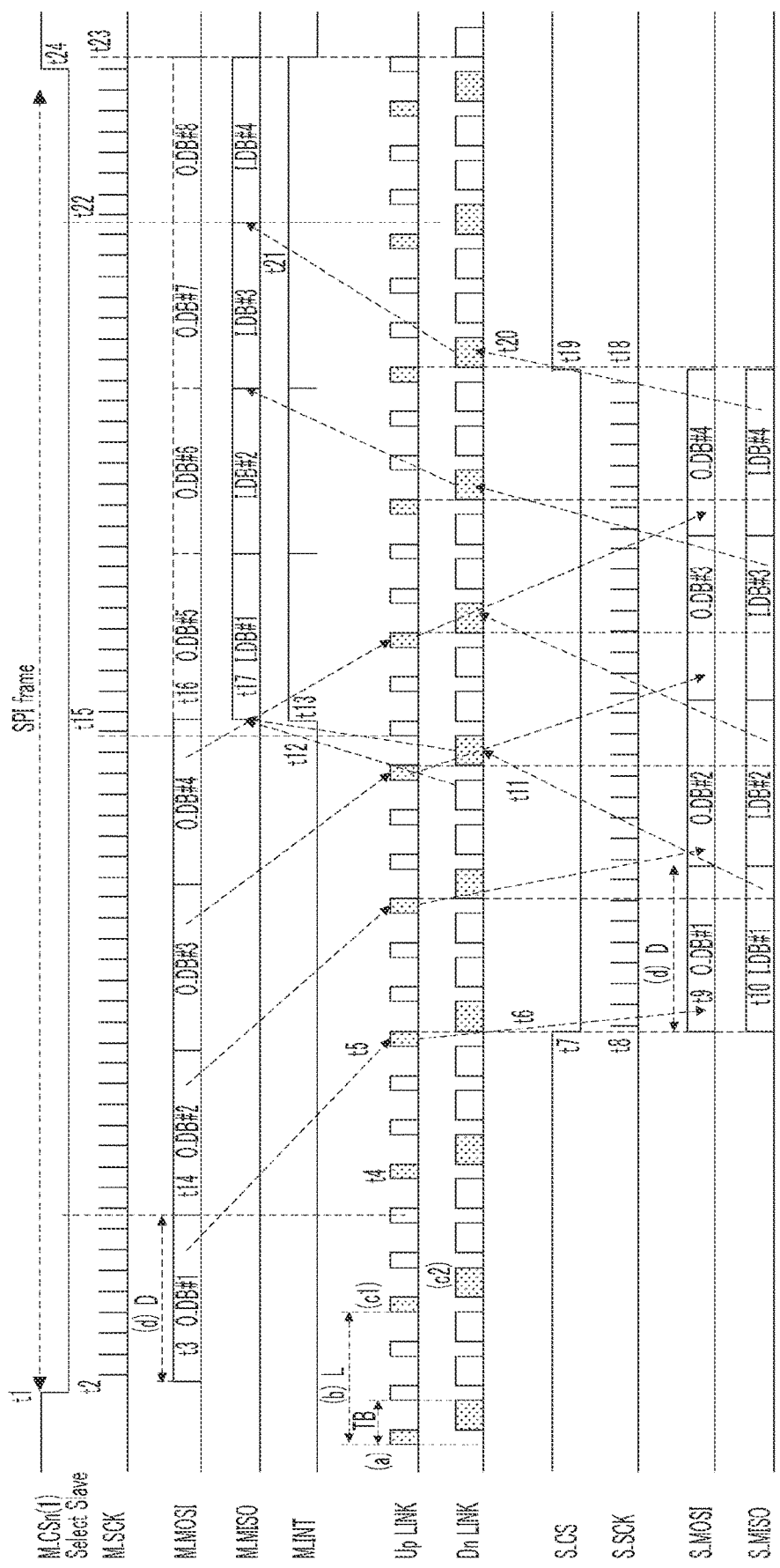
FIG. 5 is a timing chart of the communication system of FIG. 1.

The S_SerDes 41 in FIG. 1 is connected to the SPI/Slave 12. The S_SerDes 41 includes an SPI block 41-1 in order to transmit and receive data to and from the SPI/Slave 12 according to the SPI protocol. The SPI block 41-1 includes a controller (CNTR) 41-1-4, an SCK generator 41-1-3, a shift register 41-1-1, and a buffer/memory 41-1-2. The controller 41-1-4 controls a timing and frequency of the SCK output from the SCK generator 41-1-3 on the basis of the SPI control information from the SPI/Master 11. Once the controller 41-1-4 activates the CS signal corresponding to the SPI/Slave 12 and the SCK generator 41-1-3 outputs the SCK, the shift register 41-1-1 outputs the SPI data in synchronization with the SCK and supplies the SPI data to the SPI/Slave 12 via an S_MOSI pin. In addition, the SPI data output from the SPI/Slave 12 via the S_MISO pin is input to the shift register 41-1-1 in synchronization with the SCK. In addition, the S_SerDes 41 includes a packet encoder (ECP) 41-2, a packet decoder (DCP) 41-3, the DLL 41-4, and a PHY layer block (PHY) 41-5. The ECP 41-2 in the S_SerDes 41 converts the SPI data stored in the buffer/memory 41-1-2 into a packet (SPI packet) conforming to the TDD scheme. The DLL 41-4 combines the SPI packet generated by the ECP 41-2 with other transmission packets other than the SPI packet to generate a downlink packet. The PHY 41-5 transmits the downlink packet to the M_SerDes 31 via the downlink. FIG. 5 is a timing chart of the communication system 2 of FIG. 1. In FIG. 5, a TDD burst period when the M_SerDes 31 and the S_SerDes 41 perform serial communication by using the TDD scheme is TB, and one TDD frame period is L. In addition, an SPI data block length is D. An SPI data block includes N-byte SPI data, and all the N-byte data are transmitted by one TDD burst signal. The one TDD burst signal is a serial signal transmitted in one TDD burst period TB.

Each of the uplink packet and the downlink packet is transmitted as one TDD burst signal in one TDD burst period. The example of FIG. 5 illustrates an example in which there are four TDD burst periods in one TDD frame period, and one TDD burst signal (uplink packet) including the SPI data block is transmitted in one TDD burst period.

In order to transmit all of the SPI data transmitted from the SPI/Master 11 to the SPI/Slave 12, a transmission capacity of an SPI transmission slot allocated to the TDD burst period needs to be equal to or larger than a transmission capacity of the SPI data. Therefore, a relationship between the SPI data block length D and a cycle L of the TDD burst signal for transmitting the SPI data needs to be D≥L.

A timing at which the SPI data is generated is irrelevant to the TDD burst signal because the SPI/Master 11 determines the timing depending on the convenience of its own application.

Therefore, in a case where L is excessively short with respect to D, that is, in a case where the number of allocated TDD bursts for transmitting the SPI data is excessively large, the number of TDD bursts that do not transmit the SPI data increases, and the entire transmission capacity is wasted. Therefore, a relationship between the SPI data block time length D and the cycle L of the TDD burst signal for transmitting the SPI data is desirably D≥L>D/2.

Figure 6A:
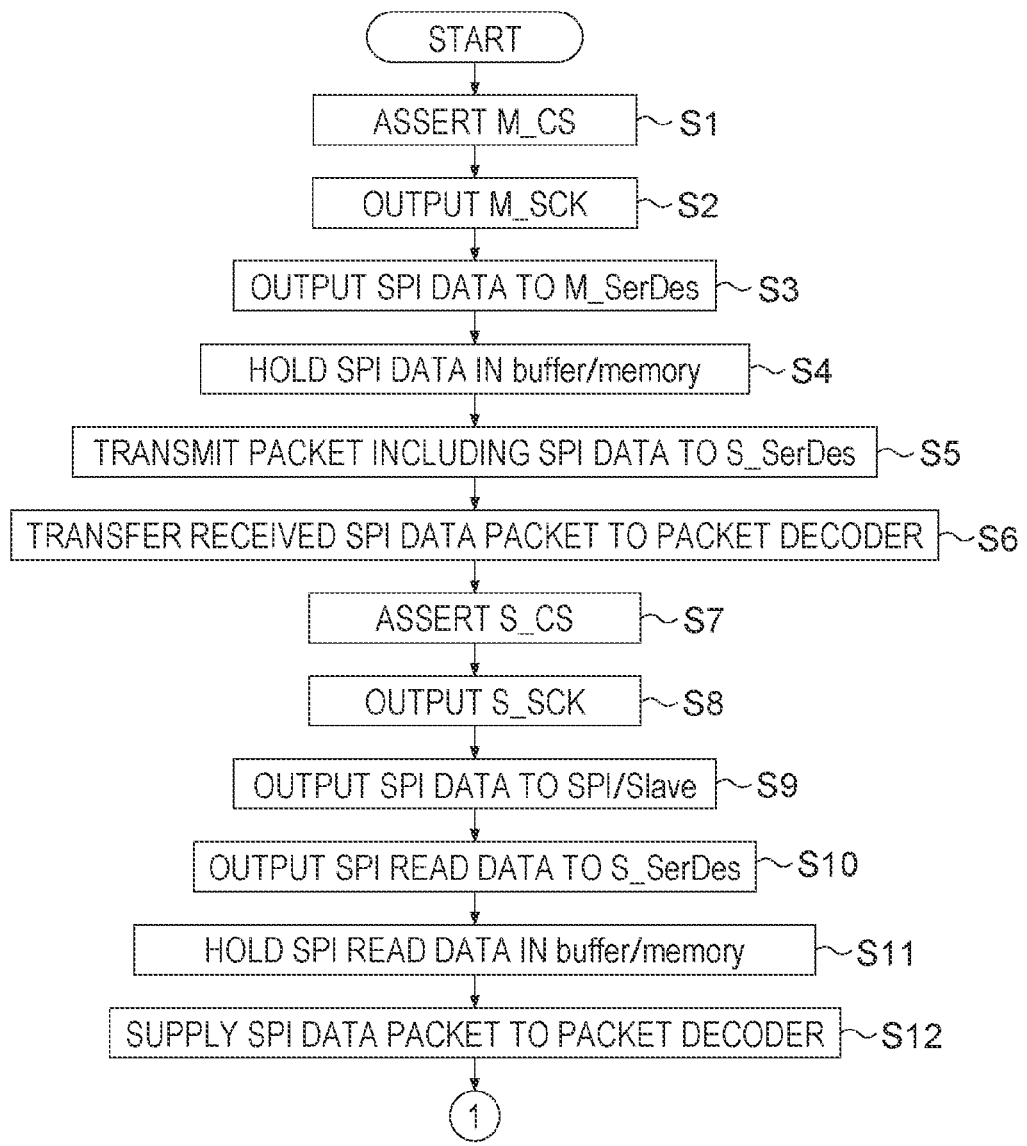
FIG. 6A is a flowchart illustrating a processing operation of the communication system of FIG. 1.
Figure 6B:
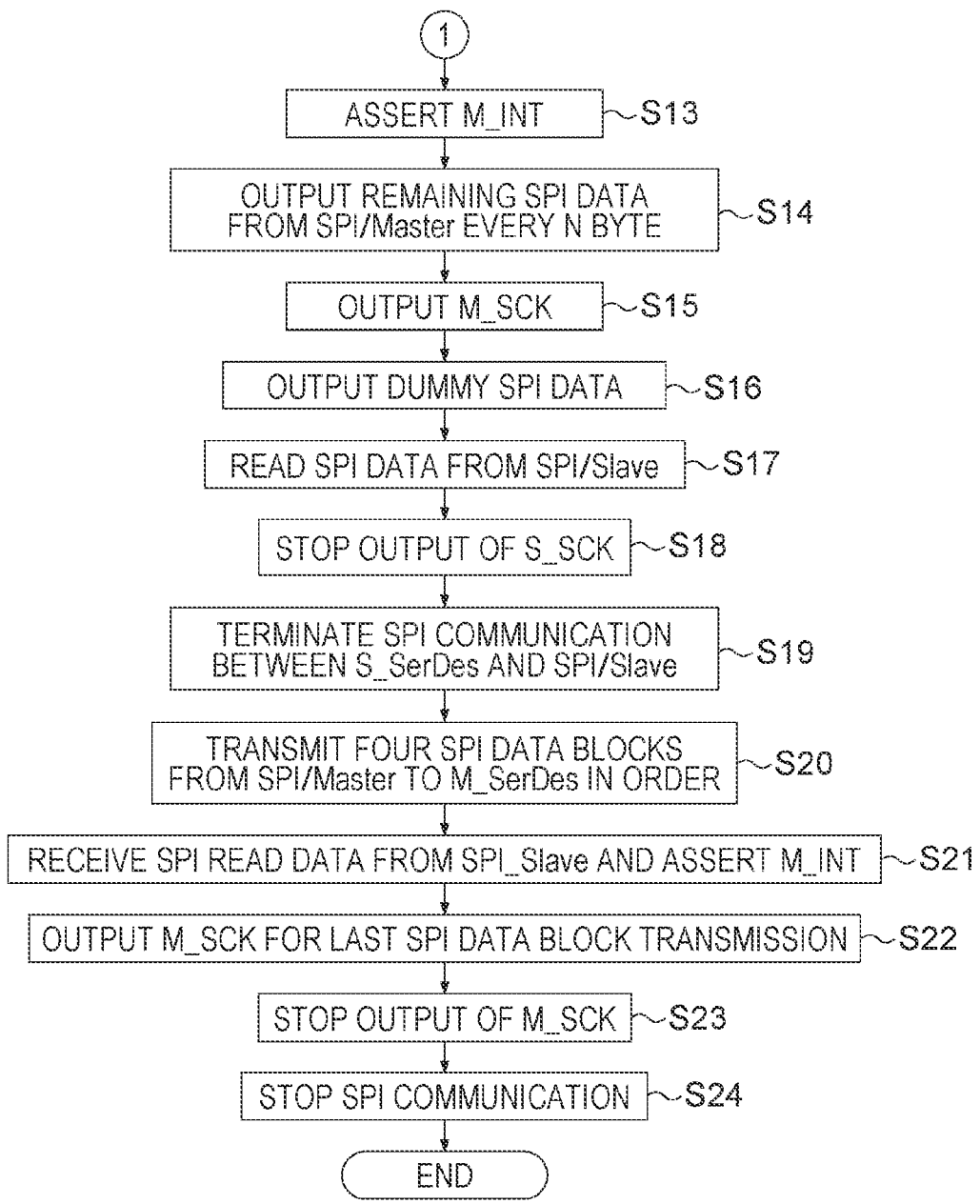
FIG. 6B is a flowchart continued from FIG. 6A.

FIGS. 6A and 6B are flowcharts illustrating a processing operation of the communication system 2 of FIG. 1. Hereinafter, the operation of the communication system 2 of FIG. 1 will be described on the basis of the flowcharts of FIGS. 6A and 6B with reference to the timing chart of FIG. 5.

First, the SPI/Master 11 asserts a chip select signal CS (M_CS) to start SPI communication (Step S1 (time t1)), and starts output of the SCK (M_SCK) for SPI communication (Step S2 (time t2)).

The SPI/Master 11 outputs an N-byte SPI data block (O_DB #1) transmitted in synchronization with M_SCK to the M_SerDes 31 (Step S3 (time t3)). The M_SerDes 31 temporarily holds the received SPI data block (O_DB #1) in the buffer/memory 31-1-2 (Step S4 (time t4)). The buffer/memory 31-1-2 does not transfer the SPI data block (O_DB #1) but holds it as it is during the first uplink TDD burst period allocated for transmitting the SPI data scheduled by the DLL 31-4. This holding period is provided to generate a minimum delay time L for continuously reading and writing the SPI data with the SPI/Slave 12 from the SPI/Master 11 via the M_SerDes 31 and the S_SerDes 41. The delay time L is the same as one TDD frame period L.

The buffer/memory 31-1-2 holds the SPI data block (O_DB #1) and then transfers the encapsulated SPI data block (O_DB #1) via the packet encoder 31-2 that performs encapsulation processing for transmitting the SPI data during the uplink TDD burst period allocated for transmitting the second SPI data (Step S5 (time t5)). In the encapsulated SPI information, information indicating how many blocks the SPI data includes is described. FIG. 5 illustrates an example in which a packet including four SPI data blocks is transmitted. The M_SerDes 31 transmits the uplink packet to the S_SerDes 41 via the cable 103.

The S_SerDes 41 decodes the uplink packet including the received SPI data block (O_DB #1) via the PHY 41-5 and the DLL 41-4, and transfers the SPI data packet to the packet decoder 41-3 (Step S6 (time t6)). The packet decoder 41-3 decodes the SPI data packet and passes the decoded SPI data block (O_DB #1) to the SPI block 41-1.

The controller 41-1-4 of the SPI block 41-1 in the S_SerDes 41 asserts a CS (S_CS) instructing the SPI/Slave 12 to start SPI communication for transferring the SPI data block (O_DB #1) (Step S7 (time t7)).

The SPI block 41-1 of the S_SerDes 41 causes the SPI/Slave 12 to start the output of the SCK (S_SCK) of the SPI for transferring the SPI data block (O_DB #1) (Step S8 (time t8)). A frequency of S_SCK is the same as the SCK (M_SCK) on the SPI/Master 11 side.

The SPI block 41-1 of the S_SerDes 41 outputs an N-byte SPI data block (O_DB #1) to the SPI/Slave 12 in synchronization with S_SCK (Step S9 (time t9)).

The SPI/Slave 12 synchronizes SPI read data (I_DB #1) with S_SCK at the same time, and outputs the SPI read data of N bytes which is the same as write data (O_DB #1) (Step S10 (time t10)).

The S_SerDes 41 temporarily holds the received N-byte SPI read data (I_DB #1) in the buffer/memory 41-1-2 (Step S11 (time t11)). After holding the N-byte SPI data block (I_DB #1), the buffer/memory 41-1-2 transfers the encapsulated SPI data block (I_DB #1) via the packet encoder 41-2 that performs encapsulation processing for transmitting the SPI data during the downlink TDD burst period allocated for transmitting the first SPI data scheduled by the DLL 41-4. The S_SerDes 41 transmits the downlink packet to the M_SerDes 31 via the cable 103.

The M_SerDes 31 decodes the downlink packet including the received SPI data block (I_DB #1) via the PHY 31-5 and the DLL 31-4, and supplies the SPI data packet to the packet decoder 31-3 (Step S12 (time t12)). The packet decoder 31-3 decodes the SPI data packet and passes the decoded SPI data block (I_DB #1) to the SPI block 31-1.

Upon receiving the decoded SPI data block (I_DB #1), the buffer/memory 31-1-2 in the SPI block 31-1 of the M_SerDes 31 asserts the interrupt signal M_INT indicating that there is valid SPI data to be transmitted to the SPI/

Master 11 (Step S13 (time t13)). The interrupt signal M_INT is transmitted to the SPI/Master 11.

Upon receiving the interrupt signal M_INT after outputting the SPI data block (O_DB #1), the SPI/Master 11 continues outputting the remaining SPI data to be transmitted every N bytes in synchronization with M_SCK (Step S14 (time t14)). In the example of FIG. 5, SPI data blocks (O_DB #1 to O_DB #4) are output. The M_SerDes 31 and the S_SerDes 41 repeat the processing in Steps S5 to S14 described above for each N-byte SPI data block (O_DB #X).

Upon receiving the interrupt signal M_INT indicating that there is valid SPI data from the M_SerDes 31, the SPI/Master 11 outputs the SCK (M_SCK) of N bytes in order to read the SPI data block (I_DB #1) (Step S15 (time t15)).

In the example of FIG. 5, since the SPI write data is 4 N bytes, a dummy SPI data block (O_DB #5) is output in order to read the read SPI data block (I_DB #1), but this dummy SPI data block (O_DB #5) is not transmitted to the S_SerDes 41 (Step S16 (time t16)).

The SPI/Master 11 outputs the dummy SPI data block (O_DB #5) by the SCK (M_SCK) and reads the read data (I_DB #1) from the SPI/Slave 12 (Step S17 (time t17)). Writing and reading of the SPI data of N bytes from the SPI/Master 11 to the SPI/Slave 12 are completed by the operation so far.

After receiving the SPI data corresponding to the number of blocks described in the SPI data packet (four blocks in FIG. 5), the controller 41-1-4 in the SPI block 41-1 of the S_SerDes 41 stops the output of S_SCK to indicate to the SPI/Slave 12 that the SPI communication is to be terminated (Step S18 (time t18)). Further, the SPI communication between the S_SerDes 41 and the SPI/Slave 12 is terminated by deasserting S_CS (Step S19 (time t19)).

The S_SerDes 41 performs the same processing as in Step S11 on the SPI read data (I_DB #X) of four blocks received from the SPI/Slave 12, and transmits the SPI read data to the M_SerDes 31 via the downlink (Step S20 (time t20)). The M_SerDes 31 performs the same processing as in Steps S12 and S13 on the received SPI data blocks (I_DB #2 to I_DB #4) (Step S21 (time t21)).

Upon receiving the interrupt signal M_INT indicating that there is valid SPI data from the M_SerDes 31, the SPI/Master 11 outputs the SCK (M_SCK) of N bytes in order to read the SPI data block (I_DB #4) which is the last block (Step S22 (time t22)).

After receiving the SPI data corresponding to desired blocks (four blocks in FIG. 5), the controller 11-3 in the SPI/Master 11 stops the output of M_SCK to indicate to the M_SerDes 31 that the SPI communication is to be terminated (Step S23 (time t23)). Further, the SPI communication between the SPI/Master 11 and the M_SerDes 31 is terminated by deasserting M_CSn(1) (Step S24 (time t24)).

In a relationship between the time t2 at which the SPI/Master 11 starts the SPI communication and the generation timing (time t5) of the TDD burst period allocated to transmit the SPI data as illustrated in FIG. 5, a timing at which the SPI read data (I_DB #1) from the SPI/Slave 12 to the SPI/Master 11 is returned for the SPI data block (O_DB #1) written to the SPI/Slave 12 by the SPI/Master 11, and is read by the SPI/Master 11 is after five SPI data blocks (time t16 (O_DB #5)).

FIG. 7 is a timing chart according to a modified example of FIG. 5. FIG. 7 illustrates an example in which a phase relationship between a communication start timing t2 for the SPI data and the timing t5 of the TDD burst period in which the SPI data is first transmitted is different from that in FIG. 5.

In FIG. 7, the SPI read data (I_DB #1) from the SPI/Slave 12 to the SPI/Master 11 is returned for the SPI data block (O_DB #1) written to the SPI/Slave 12 by the SPI/Master 11, and a timing at which the SPI/Master 11 can read the SPI read data is after six SPI data blocks (time t16 (O_DB #6)).

As illustrated in FIGS. 5 and 7, a timing at which the SPI/Master 11 can read the SPI read data from the SPI/Slave 12 differs depending on the relationship between the SPI data communication start timing and the TDD burst timing. Therefore, the M_SerDes 31 may require the interrupt signal (M_INT in FIG. 1) for indicating to the SPI/Master 11 that the SPI data from the SPI/Slave 12 has arrived.

However, since the interrupt signal may require a physical pin as described above, the interrupt signal may cause an increase in cost as described above. In the communication systems 2 according to first and second embodiments as described later, the SPI/Master 11 grasps a timing at which data from the SPI/Slave 12 arrives without requiring the interrupt signal, and transmits the next SPI data to the M_SerDes 31.

First Embodiment

Figure 8:
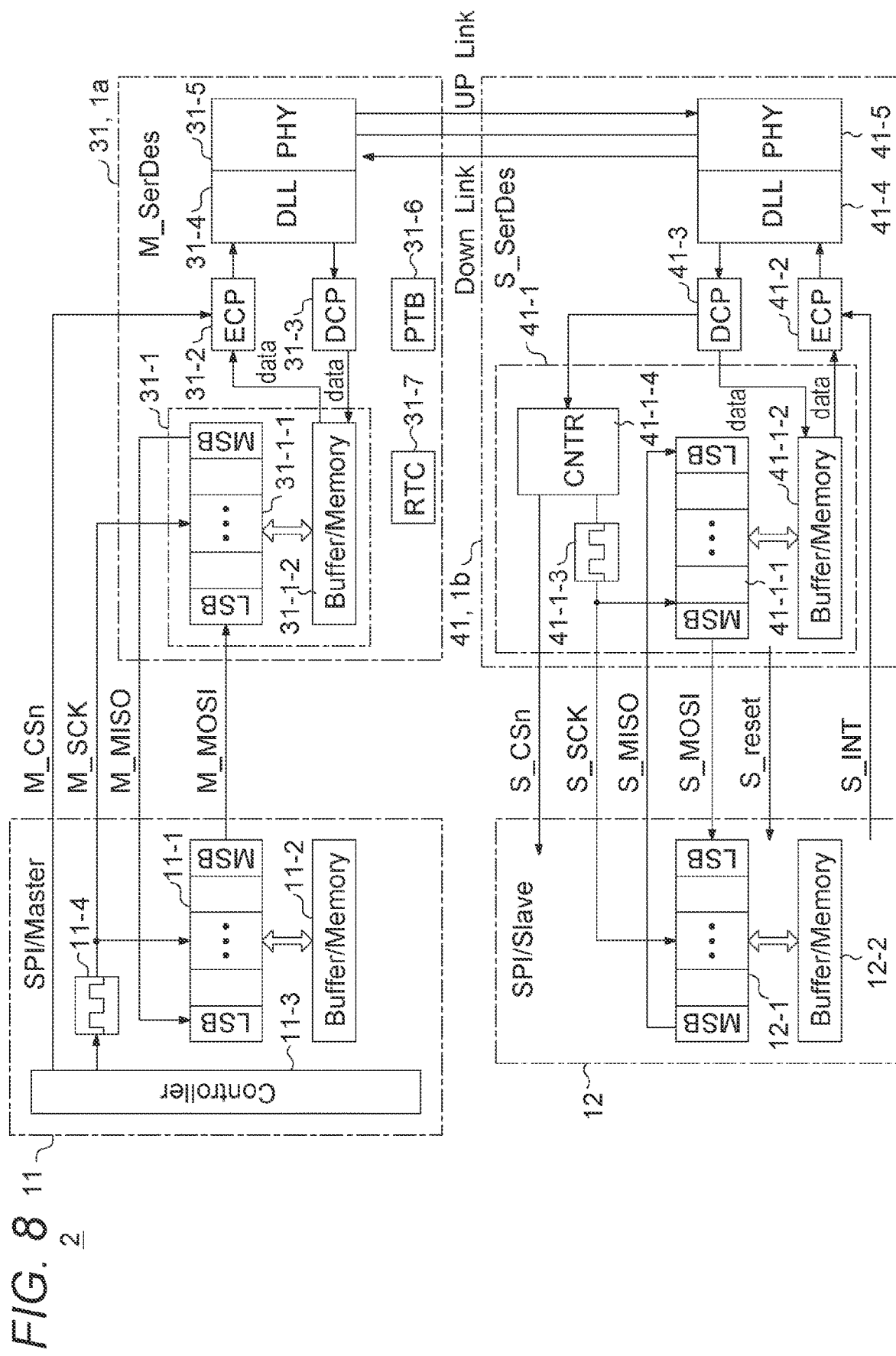
FIG. 8 is a block diagram illustrating a schematic configuration of a communication system according to a first embodiment.

FIG. 8 is a block diagram illustrating a schematic configuration of the communication system 2 according to the first embodiment. In FIG. 8, components common to those in FIG. 1 are denoted by the same reference signs, and differences will be mainly described below. The communication system 2 of FIG. 8 includes the SPI/Master 11, the M_SerDes 31, the S_SerDes 41, and the SPI/Slave 12 configured similarly to those in FIG. 1. The M_SerDes 31 in the communication system 2 of FIG. 8 includes a precision time base (PTB) counter (first counter) 31-6 and a real time counter (RTC) (second counter) 31-7, in addition to the internal configuration of the M_SerDes 31 of FIG. 1.

The PTB counter 31-6 measures a TDD cycle period (frame period) on the basis of time information PTB shared between the M_SerDes 31 and the S_SerDes 41 in the communication system 2. The RTC 31-7 counts the SCK supplied by the SPI/Master 11 and measures a timing for reading the SPI data from the SPI/Slave 12.

The M_SerDes 31 of FIG. 8 controls a timing at which a data block from the SPI/Master 11 stored in the buffer/memory 31-1-2 is transmitted to the DLL 31-4 and a timing at which a data block from the SPI/Slave 12 stored in the buffer/memory 31-1-2 is transmitted to the SPI/Master 11 on the basis of the number counted by the PTB counter 31-6 and the number counted by the RTC 31-7. That is, the buffer/memory 31-1-2 stores a predetermined number of data blocks from the SPI/Master 11 at a timing corresponding to the count values of the PTB counter 31-6 and the RTC counter 31-7, and then outputs the stored data blocks from the SPI/Slave 12.

FIG. 8 illustrates an example in which the S_SerDes 41 and the SPI/Slave 12 are separate devices, but the S_SerDes 41 and the SPI/Slave 12 may be integrated as one device. In this case, an SPI protocol signal group is treated as an internal signal of the integrated device. The buffer/memory 31-1-2 in the M_SerDes 31 of FIG. 8 stores a predetermined number of data blocks in a predetermined number (one or more) of frame periods transmitted from the SPI/Master 11, and then outputs the data blocks transmitted from the SPI/Slave 12 and stored to transmit the stored data blocks to the SPI/Master 11. The predetermined number of data blocks is, for example, a predetermined number (for example, four) of continuous data blocks corresponding to information (C-5 in FIG. 10 as described later) regarding the total number of data blocks included in the serial signal group transmitted from the SPI/Master 11.

After the data block transmitted from the SPI/Master 11 is stored in the buffer/memory 31-1-2, the DLL 31-4 in the M_SerDes 31 of FIG. 8 transmits the data block stored in the buffer/memory 31-1-2 to the S_SerDes 41 in a frame period after a second period elapses. The second period is one TDD frame period L.

The shift register 31-1-1 in the M_SerDes 31 of FIG. 8 sequentially stores a predetermined number of data blocks transmitted from the SPI/Master 11 in the buffer/memory 31-1-2 every first period, and then sequentially reads the data blocks transmitted from the S_SerDes 41 and stored in the buffer/memory 31-1-2 from the buffer/memory 31-1-2 every first period and transmits the data blocks to the SPI/Master 11. The first period is the SPI data block length D.

The shift register 31-1-1 sequentially reads the data blocks from the S_SerDes 41 stored in the buffer/memory 31-1-2 and transmits the data blocks to the SPI/Master 11 without transmitting an interrupt signal indicating that the data block from the S_SerDes 41 has arrived to the SPI/Master 11.

As described above, in the communication system 2 of FIG. 8, when the M_SerDes 31 receives the SPI data from the SPI/Slave 12, the received data can be transmitted from the M_SerDes 31 to the SPI/Master 11 without transmitting the interrupt signal M_INT to the SPI/Master 11. As a result, the interrupt signal M_INT is unnecessary, and a procedure of data transmission and reception between the SPI/Master 11 and the M_SerDes 31 can be simplified.

Figure 9:
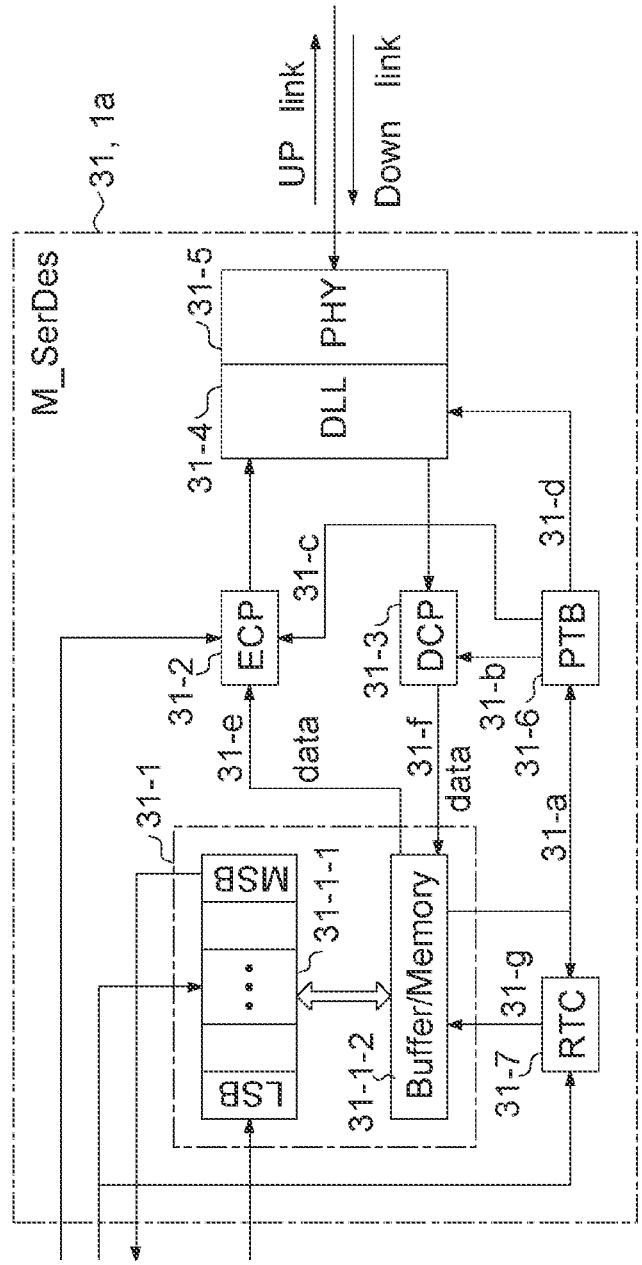
FIG. 9 is a diagram illustrating a signal flow of each unit in an M_SerDes of FIG. 8.

FIG. 9 is a diagram illustrating a signal flow of each unit in the M_SerDes 31 of FIG. 8. As illustrated in FIG. 9, the RTC 31-7 performs a counting operation by the SCK supplied from the SPI/Master 11, and the count value of the RTC 31-7 is transmitted to the buffer/memory 31-1-2. The counting operation of the RTC 31-7 is controlled by data stored in the buffer/memory 31-1-2.

The PTB counter 31-6 measures a TDD cycle L. The accuracy of the PTB counter 31-6 is very high, and for example, the TDD cycle L can be accurately measured by a clock of 250 MHz (hereinafter, referred to as a PTB clock). The PTB clock is a clock of a frequency (for example, 250 MHz) defined by the ASA specification.

FIG. 10 is a diagram for describing information included in a transmission packet generated by the ECP 31-2 in the M_SerDes 31 and the ECP 41-2 in the S_SerDes 41. In FIG. 10, an identification symbol, an information name, a function in the transmission packet for performing data transmission from the SPI/Master 11 to the SPI/Slave 12, a function in the transmission packet for performing data transmission from the SPI/Slave 12 to the SPI/Master 11, and a description are associated with each piece of information in the transmission packet.

C-1 is a transmission mode, and is commanded by the SPI/Master 11 as a command. The transmission mode included in the packet from the SPI/Slave 12 is used by the SPI/Master 11 to monitor the state. In a case where C-1 is 0, a set of data blocks is transmitted within one TDD frame period. In a case where C-1 is 1, a plurality of data blocks divided according to a plurality of frame periods is transmitted.

C-2 is a slave select signal (CSn signal), and is commanded by the SPI/Master 11 as a command. The CSn signal included in the packet from the SPI/Slave 12 is used by the SPI/Master 11 to monitor the state. The CSn signal is a signal for selecting the SPI/Slave 12 that the SPI/Master 11 wants to communicate with. With the CSn signal, not only an individual SPI/Slave 12 can be selected, but also the SerDes (M_SerDes 31 or S_SerDes 41) can be selected.

C-3 is an SCK frequency, and is commanded by the SPI/Master 11 as a command. The SCK frequency included in the packet from the SPI/Slave 12 is used by the SPI/Master 11 to monitor the state. In C-3, the SPI/Master 11 designates the SCK frequency on the SPI/Slave 12 side.

Figure 3A:
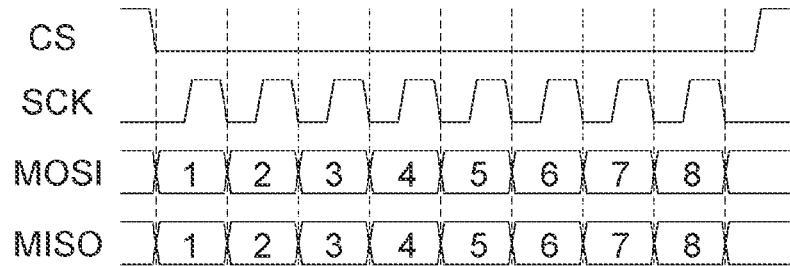
FIGS. 3A to 3D are basic signal waveform diagrams of an SPI protocol.
Figure 3B:
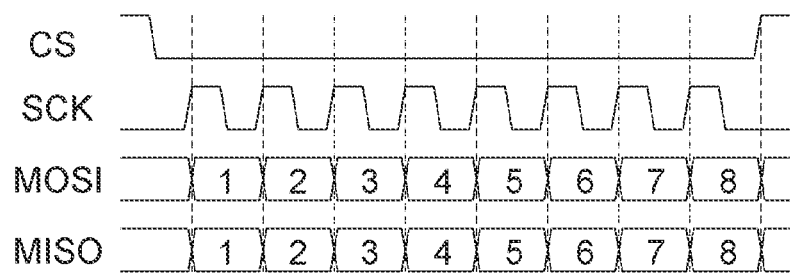
Figure 3C:
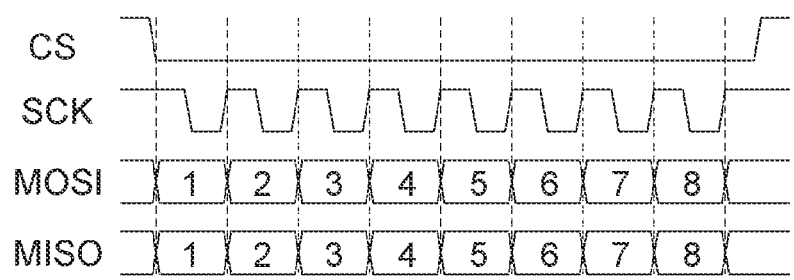
Figure 3D:
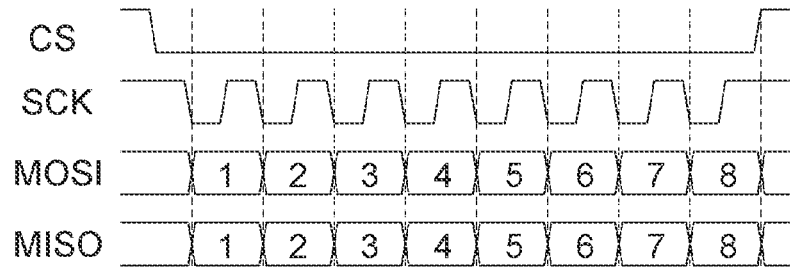

C-4 is an SPI mode, and is commanded by the SPI/Master 11 as a command. The SPI mode included in the packet from the SPI/Slave 12 is used by the SPI/Master 11 to monitor the state. For example, in a case where C-4 is 0, mode=0 in FIG. 3A is selected, in a case where C-4 is 1, mode=1 in FIG. 3B is selected, in a case where C-4 is 2, mode=2 in FIG. 3C is selected, and in a case where C-4 is 3, mode=3 in FIG. 3D is selected.

C-5 is the total number of data blocks DB, and is provided by the SPI/Master 11 as information. The total number of DBs included in the packet from the SPI/Slave 12 is used by the SPI/Master 11 to monitor the state. In a case where C-1 is 0 (at the time of transmission of the divided DB), C-5 is 1. The SPI/Slave 12 returns the number of DBs received since the start of the SPI communication.

C-6 is the current position of the data block DB and is provided by the SPI/Master 11 as information. C-6 is not included in the packet from the SPI/Slave 12. C-6 being 0 indicates that the information is invalid. In a case where C-1 is 0, C-6 is 0. C-6 being 1 indicates that the position is the head divided data. C-6 being 2 indicates that the position is divided data other than the head divided data and the final divided data. C-6 being 3 indicates that the position is the final divided data.

C-7 is a current state of the data block DB, and both the SPI/Master 11 and the SPI/Slave 12 provide as information. C-7 being 0 indicates that the data is dummy data, and C-7 being 1 indicates that the data is valid data.

C-8 is the size of the data block DB and is provided by the SPI/Master 11 as information. A data transmission size included in the packet from the SPI/Slave 12 is used by the SPI/Master 11 to monitor the state. C-8 represents the data transmission size in byte units, and the maximum size is 511 bytes.

C-9 is information regarding interruption of the SPI/Slave 12, and is an interrupt flag that is not included in the packet transmitted by the SPI/Master 11 but is included in the packet transmitted by the SPI/Slave 12. C-9 being 0 indicates that there is no interruption, and C-9 being 1 indicates that there is an interruption.

C-10 is an operation state on the SPI/Slave 12 side, and is not included in the packet transmitted by the SPI/Master 11 but is included in the packet from the SPI/Slave 12. C-10 being 0 indicates that the operation state is a normal state, and C-10 being 1 indicates that the operation state is busy (the DCP 31-3 is not empty), and C-10 being 2 indicates that an error has occurred (SPI data has been destroyed).

C-11 is a reset of the SPI block 41-1, and is commanded by the SPI/Master 11 as a command. C-11 is not included in the packet of the SPI/Slave 12. In a case where C-11 is 0, the reset is not performed, and in a case where C-11 is 1, the SPI block 41-1 of the S_SerDes 41 is reset.

C-12 is a number of the current data block. In a case of transmitting the packet from the M_SerDes 31 to the S_SerDes 41, the M_SerDes 31 assigns an ID number to each packet. In a case where the packet is transmitted from the S_SerDes 41 to the M_SerDes 31, the S_SerDes 41 assigns, to each packet, the same ID number as the ID number of the packet received from the M_SerDes 31. D-1 is SPI data transmitted together with C-1 to C-12 described above, the SPI data transmitted by the SPI/Master 11 is output from an M_MOSI pin, and the SPI data transmitted by the SPI/Slave 12 is output from an S_MISO pin.

E-1 is a CRC transmitted together with C-1 to C-12 and D-1 described above, and is included in both the SPI data transmitted from the SPI/Master 11 and the SPI data transmitted from the SPI/Slave 12. The CRC is used in error detection for the control data C-1 to C-12 and the SPI data.

Figure 11:
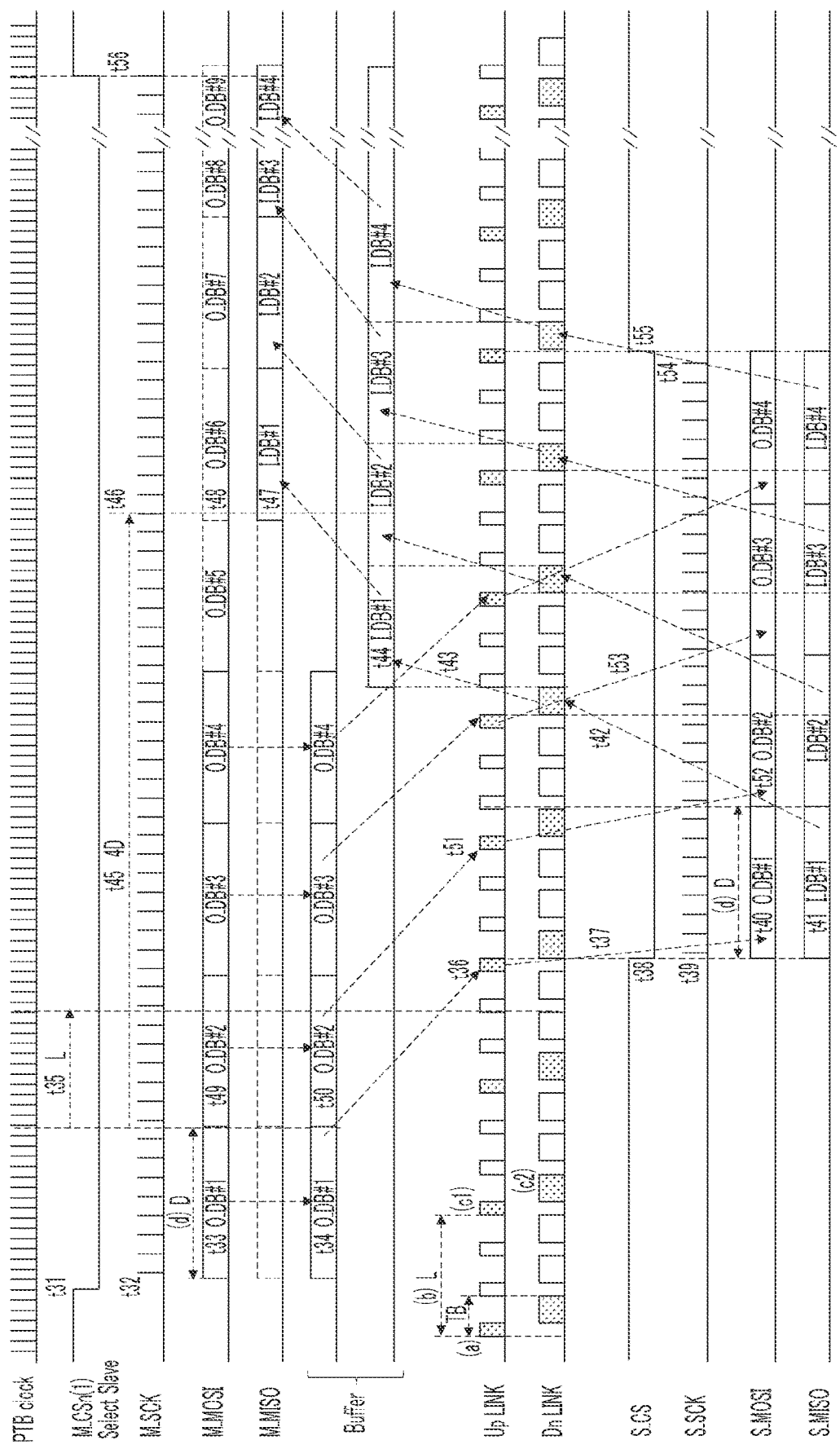
FIG. 11 is a timing chart of the communication system according to the first embodiment.
Figure 12A:
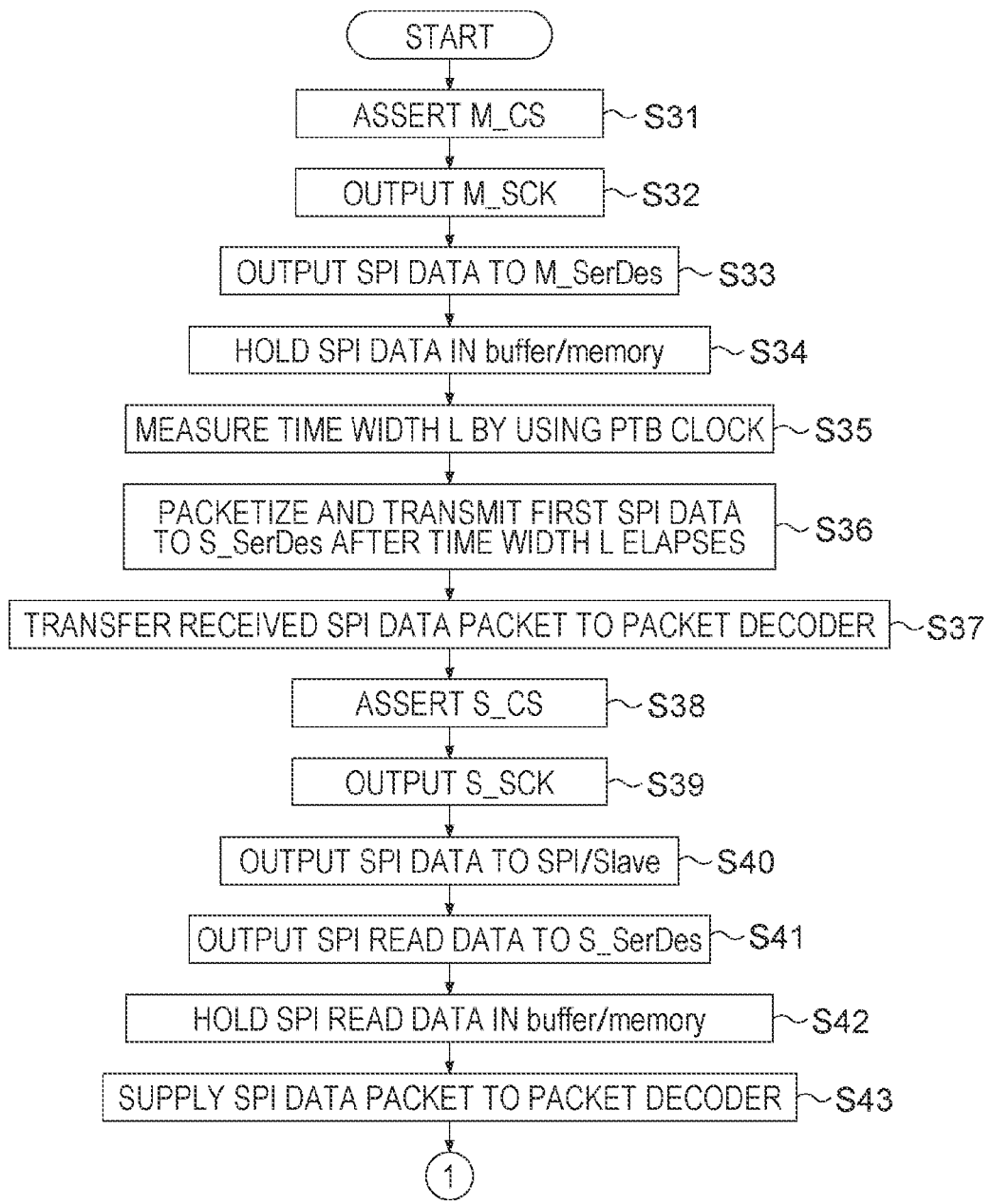
FIG. 12A is a flowchart of the communication system according to the first embodiment.
Figure 12B:
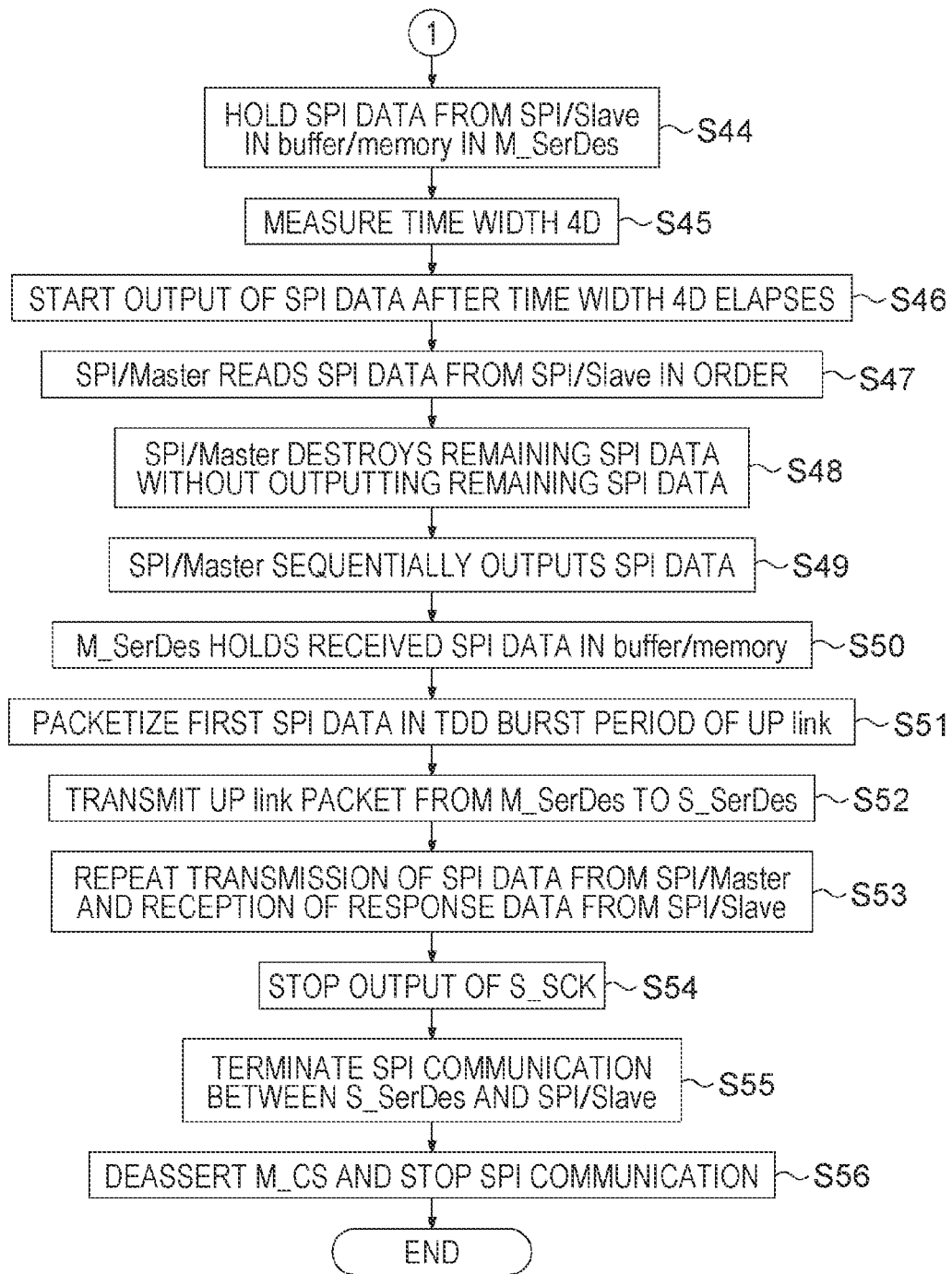
FIG. 12B is a flowchart continued from FIG. 12A.

FIG. 11 is a timing chart of the communication system 2 according to the first embodiment. FIGS. 12A and 12B are flowcharts of the communication system 2 according to the first embodiment. Hereinafter, a processing operation of the communication system 2 according to the first embodiment will be described on the basis of FIGS. 12A and 12B with reference to FIG. 11.

The SPI/Master 11 asserts a CS (M_CS) to start SPI communication (Step S31 (time t31)). Next, the SPI/Master 11 starts output of the SCK (M_SCK) of the SPI (Step S32 (time t32)).

The SPI/Master 11 outputs an N-byte SPI data block (O_DB #1) transmitted in synchronization with the SCK to the M_SerDes 31 (Step S33 (time t33)). In parallel with this, reading of data from the M_SerDes 31 is performed, and since the SPI/Master 11 knows that valid read data from the SPI/Slave 12 is obtained after the fifth SPI data block, discarding of the first to fifth SPI data blocks is performed. In this way, the discarding of the SPI data blocks is continued until the fifth SPI data block (O_DB #5).

The M_SerDes 31 temporarily holds the SPI data block (O_DB #1) received from the SPI/Master 11 in the buffer/memory 31-1-2 (Step S34 (time t34)).

The PTB counter 31-6 measures a time width L by using the PTB clock, with a time point when the buffer/memory 31-1-2 stores the last data in the SPI data block (O_DB #1) as a starting point (31-*a* in FIG. 9) (Step S35 (time t35)). After the time width L measured in Step S35 has elapsed (31-*c* in FIG. 9), the buffer/memory 31-1-2 outputs the first SPI data block (O_DB #1) to the ECP 31-2 in order to transmit the SPI data during the uplink TDD burst period allocated for transmitting the SPI data block (31-*e* in FIG. 9) (Step S36 (time t36)). The ECP 31-2 packetizes the SPI data block (O_DB #1) on the basis of information packetizing the SPI data received from the SPI/Master 11 in advance before performing the processing of Step S31, and outputs the packetized SPI data block (O_DB #1) to the DLL 31-4. In this case, a flag (C-7 in FIG. 10 as described later) for indicating that the SPI data is valid is set to valid. The packetized SPI data block (O_DB #1) is output as an uplink packet to the cable 103 via the DLL 31-4 and the PHY 31-5.

The S_SerDes 41 decodes the uplink packet including the received SPI data block (O_DB #1) via the PHY 41-5 and the DLL 41-4, and supplies the SPI data packet to the packet decoder 41-3 (Step S37 (time t37)). The packet decoder 41-3 decodes the SPI data packet and passes the decoded SPI data block (O_DB #1) to the SPI block 41-1.

The controller 41-1-4 in the SPI block 41-1 of the S_SerDes 41 asserts a CS (S_CS) indicating to the SPI/Slave 12 that SPI communication for transferring the SPI data block (O_DB #1) starts (Step S38 (time t38)). How long to assert is determined on the basis of an SPI transmission mode included in the SPI data packet, the data size (N bytes) of the SPI data block, and information regarding the number of SPI data blocks included in one SPI communication.

The SPI block 41-1 of the S_SerDes 41 causes the SPI/Slave 12 to start the output of the SCK (S_SCK) of the SPI for transferring the SPI data block (O_DB #1) (Step S39 (time t39)). Reproduction is performed using SCK frequency information included in the SPI data packet, and the same frequency as that of the SCK (M_SCK) on the SPI/Master 11 side is used.

The SPI block 41-1 of the S_SerDes 41 outputs an N-byte SPI data block (O_DB #1) to the SPI/Slave 12 in synchronization with the SCK (Step S40 (time t40)). At this time, the SPI mode is determined on the basis of SPI mode information included in the SPI data packet.

The SPI/Slave 12 synchronizes the SPI read data (I_DB #1) with the SCK (S_SCK) at the same time, and outputs the SPI read data of N bytes which is the same as the write data (O_DB #1) from the SPI/Master 11 (Step S41 (time t41)).

The S_SerDes 41 temporarily holds the received N-byte SPI read data (I_DB #1) in the buffer/memory 41-1-2 (Step S42 (time t42)). The buffer/memory 41-1-2 holds the N-byte SPI data block (I_DB #1), and then generates a downlink packet (I_DB #1) including encapsulated SPI data via the packet encoder 41-2 that performs encapsulation processing for transmitting the SPI data during the downlink TDD burst period allocated for transmitting the first SPI data scheduled by the DLL (DLL 41-4 of FIG. 8).

The S_SerDes 41 transmits the downlink packet to the M_SerDes 31 via the cable 103.

The M_SerDes 31 decodes the downlink packet including the received SPI data block (I_DB #1) via the PHY 31-5 and the DLL 31-4, and supplies the decoded SPI data packet to the packet decoder 31-3. The packet decoder 31-3 decodes the SPI data packet and passes the decoded SPI data block (I_DB #1) to the SPI block 31-1 (31-*f* in FIG. 9) (Step S43 (time t43)).

The buffer/memory 31-1-2 in the SPI block 31-1 temporarily holds the SPI data block (I_DB #1) (Step S44 (time t44)).

The RTC 31-7 (RTC 31-7 of FIG. 8) measures a time width 4D by using the SCK with a time point when the buffer/memory 31-1-2 records the last data in the SPI data block (O_DB #1) as a starting point (31-*a* in FIG. 9) (Step S45 (time t45)).

The buffer/memory 31-1-2 starts outputting an N-byte SPI data block (O_DB #1) in synchronization with the SCK, with the next SCK of which the time width 4D has been measured by the RTC 31-7 using the SCK, that is, an output start time point 31-*g* of SPI write data (O_DB #6) output by the SPI/Master 11 as a starting point (Step S46 (time t46)). The SPI/Master 11 sequentially reads N bytes of the SPI data block (I_DB #1) from the SPI/Slave 12 in synchronization with the SCK (Step S47 (time t47)).

The SPI/Master 11 outputs the write data (O_DB #6) at the same time, but since the M_SerDes 31 knows the number of SPI data blocks (four in this example) to be transmitted in this SPI communication in the processing performed before Step S31, these SPI data blocks are discarded without performing processing for outputting the SPI data blocks after the write data (O_DB #5) (Step S48 (time t48)).

In the processing so far, the SPI/Master 11 completes the writing of the first SPI data block (O_DB #1) to the SPI/Slave 12 and the reading of the SPI data block (I_DB #1) from the SPI/Slave 12 without using an interrupt signal.

The SPI/Master 11 outputs the next SPI data block (O_DB #2) following the first SPI data block (O_DB #1), and sequentially outputs the SPI data blocks to be transmitted (Step S49 (time t49)).

However, the SPI data blocks transmitted to the SPI/Slave 12 are (O_DB #1 to O_DB #4), and SPI data blocks after O_DB #4 are dummy data accompanying processing of reading the SPI data blocks from the SPI/Slave 12.

The M_SerDes 31 temporarily holds the received SPI data block (O_DB #2) in the buffer/memory 31-1-2 (Step S50 (time t50)).

After holding the SPI data block (O_DB #2), the buffer/memory 31-1-2 outputs the SPI data block (O_DB #2) to the ECP 31-2 to transmit the SPI data during the uplink TDD burst period allocated for transmitting the SPI data that arrives first (Step S51 (time t51)).

Here, a waiting time L as in Step S35 is not necessary. The ECP 31-2 packetizes the SPI data block (O_DB #2) on the basis of information packetizing the received SPI data in advance before the processing of Step S31, and outputs the packetized SPI data block (O_DB #2) to the DLL 31-4. The packetized SPI data block (O_DB #2) is output as an uplink packet to the cable 103 via the DLL 31-4 and the PHY 31-5 (Step S52 (time t52)). The same processing is sequentially performed for the remaining SPI write data blocks (O_DB #3 and O_DB #4).

The processing from Step S40 to the processing of Step S52 are sequentially performed on the SPI data blocks (O_DB #2, 0 DB #3, and O_DB #4) and (I_DB #2, I_DB #3, and I_DB #4) (Step S53 (time t53)).

The controller 41-1-4 in the SPI block 41-1 of the S_SerDes 41 stops the output of S_SCK to indicate to the SPI/Slave 12 that the SPI communication is to be terminated after receiving the SPI data corresponding to the blocks (four blocks in this example) described in the SPI data packet (Step S54 (time t54)).

Further, the S_SerDes 41 deasserts S_CS to terminate the SPI communication between the S_SerDes 41 and the SPI/Slave 12 (Step S55 (time t55)).

The SPI/Master 11 outputs the SCK as many as the number (4+5=9 in this example) obtained by adding, to the number of SPI data blocks (four in this example) read from the SPI/Slave 12, the number of five SPI data blocks which is a processing delay time regardless of the phase relationship between the SPI communication start timing and the TDD burst to continue the read processing up to the SPI data block (I_DB #4), and after the read processing is terminated, the SPI/Master 11 deasserts M_CS to terminate the SPI communication (Step S56 (time t56)).

By the above-described processing operation, the SPI communication between the SPI/Master 11 and the SPI/Slave 12 via the M_SerDes 31 and the S_SerDes 41 can be performed without using an interrupt signal.

Figure 13:
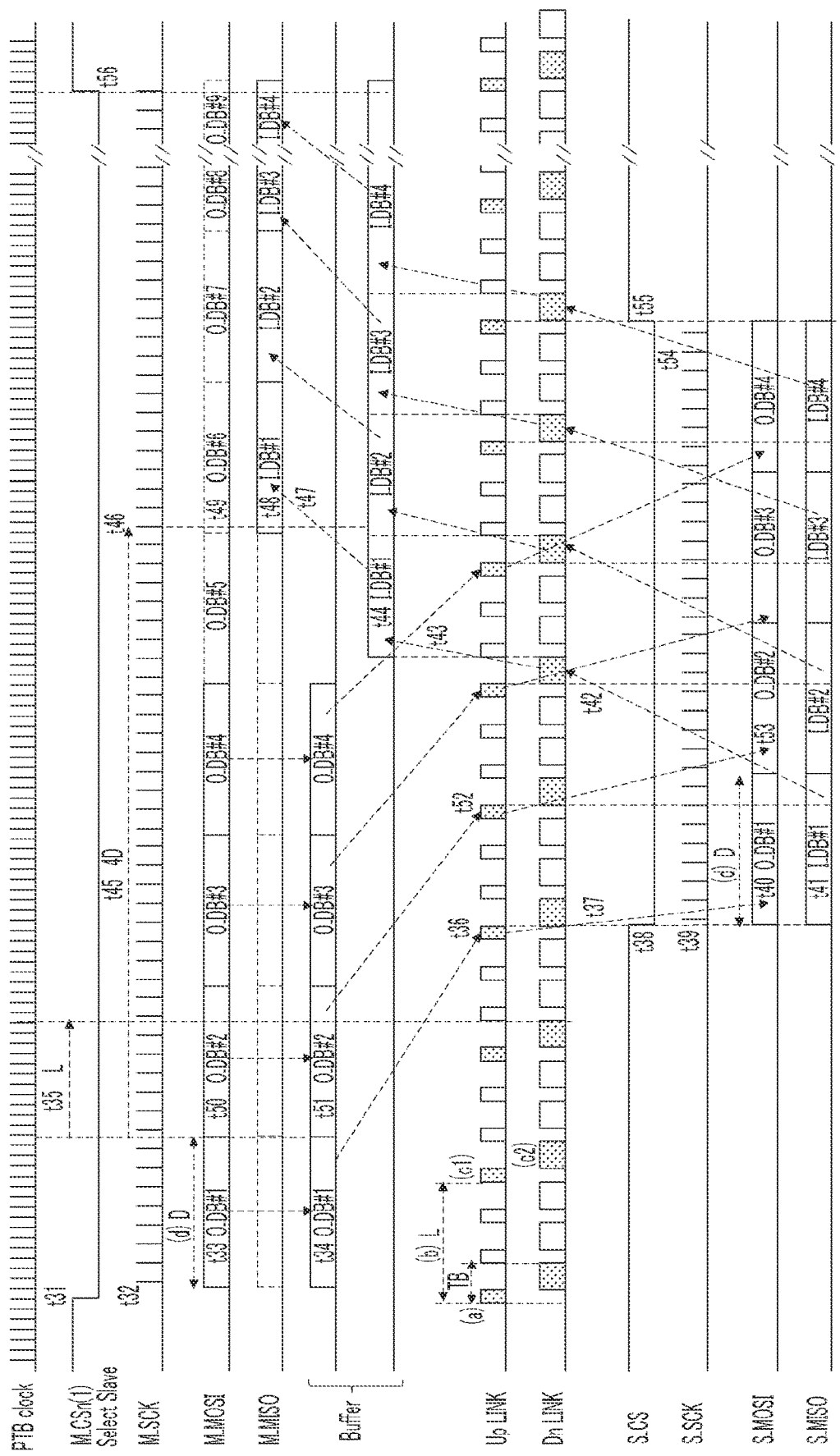
FIG. 13 is a timing chart according to a modified example of FIG. 11.

FIG. 13 is a timing chart according to a modified example of FIG. 11. FIG. 13 illustrates an example in which the relationship between the SPI communication start timing and the TDD burst signal timing is different from that in FIG. 11.

Similarly to FIG. 11, in a case where the SPI data block (O_DB #1) at the start of SPI communication is transferred to the uplink of the TDD burst signal in Step S35, the PTB counter 31-6 counts the time width L with a time point when the SPI data block (O_DB #1) is held in the buffer/memory 31-1-2 as a starting point, the SPI data is transferred as the uplink packet in the TDD burst period allocated to the subsequent SPI data, the SCK is measured from the same starting point, and the first read data from the SPI/Slave 12 is read after counting the time width 4D, so that the SPI/Master 11 can correctly read the SPI data without using an interrupt signal. The numbers and the description thereof in FIG. 13 are the same as those in FIG. 11, and thus a description thereof will be omitted.

As described above, in the first embodiment, after the SPI/Master 11 transmits four SPI data blocks to the M_SerDes 31, the M_SerDes 31 receives a packet including response data from the SPI/Slave 12 transmitted from the S_SerDes 41, and transmits the corresponding SPI data block to the SPI/Master 11. As a result, the SPI/Master 11 can grasp in advance when the response data from the SPI/Slave 12 arrives even in a case where there is no interrupt signal from the M_SerDes 31, and can correctly receive the response data. Therefore, it is not necessary to transmit and receive an interrupt signal between the SPI/Master 11 and the M_SerDes 31, and a pin for the interrupt signal is unnecessary, so that the cost can be reduced.

Second Embodiment

In the first embodiment, in a case where the SPI data block (O_DB #1) at the start of the SPI communication is transferred as the uplink packet during the TDD burst period, the PTB counter 31-6 counts the time width L with a time point when the SPI data block (O_DB #1) is held in the buffer/memory 31-1-2 as a starting point, and after the time width L has elapsed, the subsequent SPI data is sequentially transferred as the uplink packet. In addition, the SCK is measured by the RTC 31-7 from the same starting point, and then the first read data from the SPI/Slave 12 is read after counting the time width 4D. As a result, the SPI/Master 11 can correctly read the SPI data without using an interrupt signal, but on the other hand, the processing delay time L is generated until the data is transmitted from the M_SerDes 31 to the S_SerDes 41, so that the arrival of the SPI data from the SPI/Master 11 to the SPI/Slave 12 is delayed.

In the communication system 2 according to the second embodiment described below, after the M_SerDes 31 receives the SPI data block from the SPI/Master 11, the SPI data block is packetized and transmitted to the S_SerDes 41 without waiting until the processing delay time L elapses.

The communication system 2 according to the second embodiment has a block configuration similar to that in FIG. 8. After the data block transmitted from the SPI/Master 11 is stored in the buffer/memory 31-1-2, the DLL 31-4 in the M_SerDes 31 according to the second embodiment transmits the data block stored in the buffer/memory 31-1-2 to the S_SerDes 41 in a frame period before the second period elapses. In a case where a data block to be transmitted to the S_SerDes 41 is not ready, the DLL 31-4 stops transmitting the data block to the S_SerDes 41 until the next frame period. In a case where the data block from the S_SerDes 41 does not arrive for the data block from the SPI/Master 11, the buffer/memory 31-1-2 stops storing a new data block until the next frame period.

Figure 14:
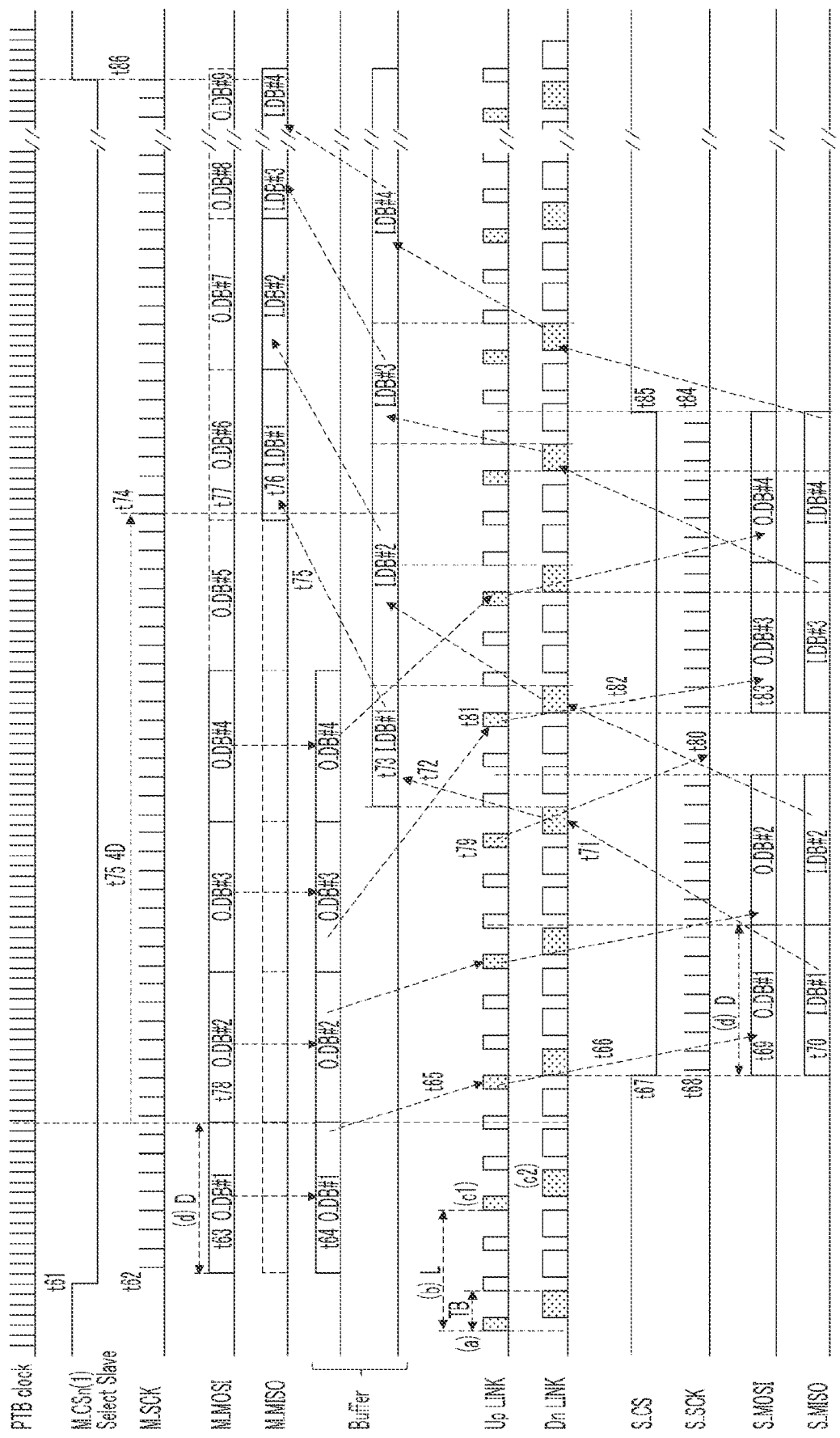
FIG. 14 is a timing chart of a communication system according to a second embodiment.
Figure 15A:
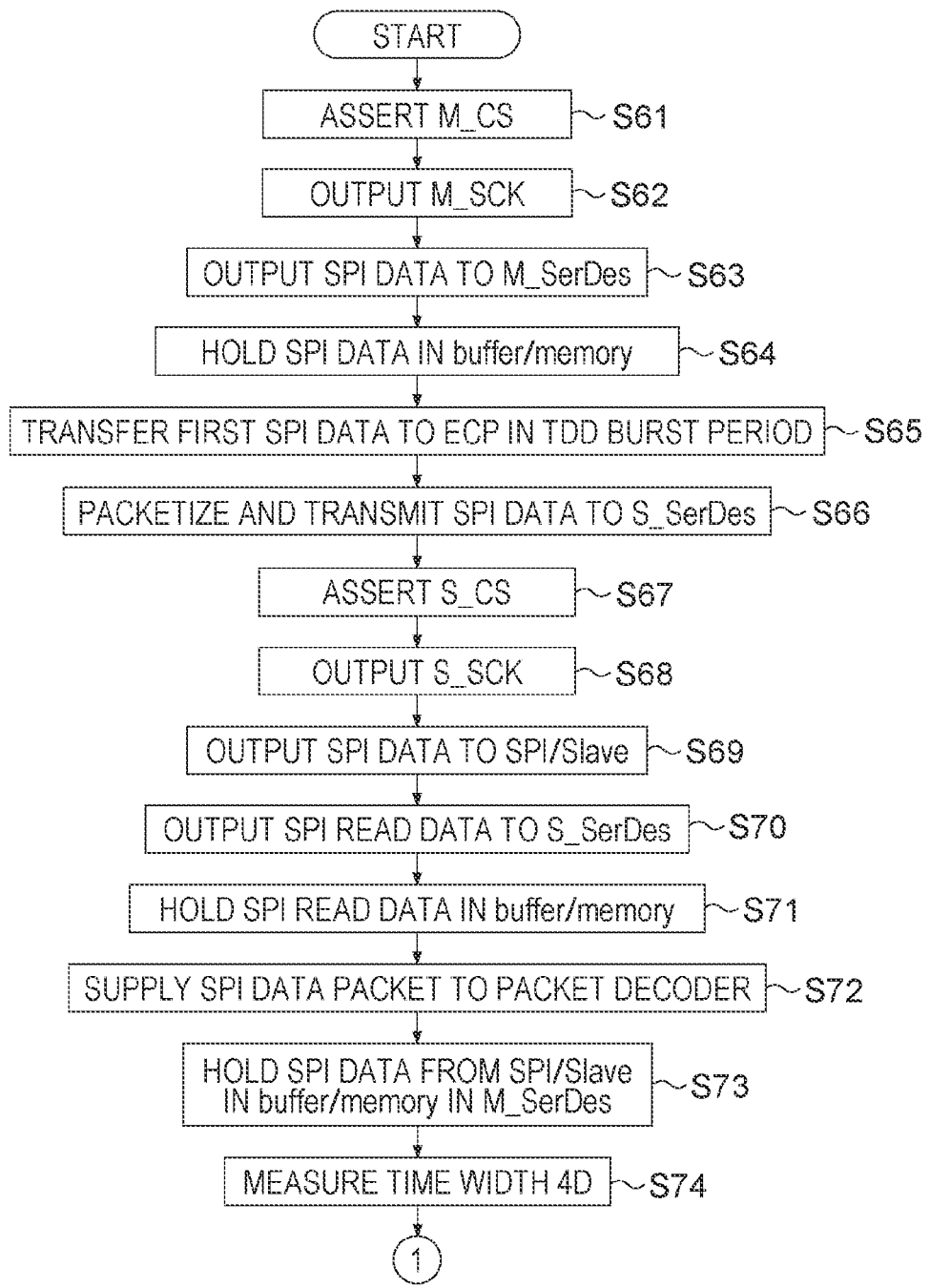
FIG. 15A is a flowchart illustrating a processing operation of the communication system according to the second embodiment.
Figure 15B:
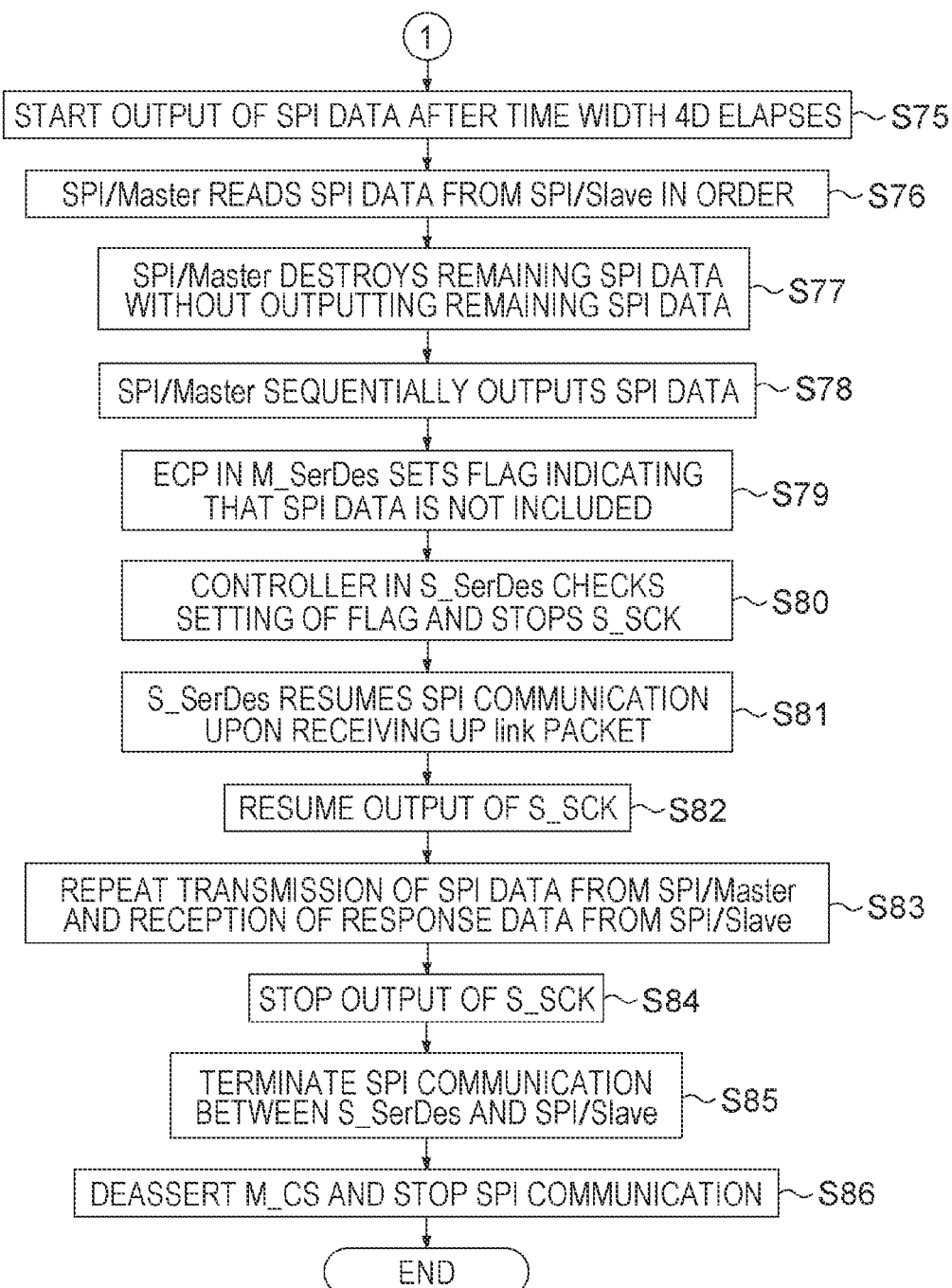
FIG. 15B is a flowchart continued from FIG. 15A.

FIG. 14 is a timing chart of the communication system 2 according to the second embodiment. FIGS. 15A and 15B are flowcharts illustrating a processing operation of the communication system 2 according to the second embodiment. Hereinafter, the processing operation of the communication system 2 according to the second embodiment will be described on the basis of FIGS. 15A and 15B with reference to FIG. 14.

The SPI/Master 11 asserts a CS (M_CS) to start SPI communication (Step S61 (time t61)). The SPI/Master 11 starts output of the SCK of the SPI (Step S62 (time t62)).

The SPI/Master 11 outputs an N-byte SPI data block (O_DB #1) transmitted in synchronization with the SCK to the M_SerDes 31 (Step S63 (time t63)). At the same time, data is read from the M_SerDes 31. Since the SPI/Master 11 knows that valid read data from the SPI/Slave 12 is obtained after transmitting five SPI data blocks, the read data from the M_SerDes 31 is discarded. The discarding of the read data is continuously performed for a period until the fifth SPI data block (O_DB #5) is transmitted.

The M_SerDes 31 temporarily holds the received SPI data block (O_DB #1) in the buffer/memory 31-1-2 (Step S64 (time t64)).

After holding the last data in the SPI data block (O_DB #1), the buffer/memory 31-1-2 outputs the SPI data block (O_DB #1) to the ECP 31-2 to transmit the SPI data block (O_DB #1) during the first incoming uplink TDD burst period allocated for transmitting the SPI data (31-*e* in FIG. 9) (Step S65 (time t65)).

The ECP 31-2 packetizes the SPI data block (O_DB #1) in a form based on FIG. 10 on the basis of information packetizing the received SPI data in advance before the processing of Step S61, and outputs the packetized SPI data block (O_DB #1) to the DLL 31-4. In this case, a flag (C-7 in FIG. 10) for indicating that the SPI data is valid is set to valid. The packetized SPI data block (O_DB #1) is output as an uplink packet to the cable 103 via the DLL 31-4 and the PHY 31-5.

The S_SerDes 41 decodes the uplink packet including the received SPI data block (O_DB #1) via the PHY 41-5 and the DLL 41-4, and supplies the SPI data packet to the packet decoder 41-3 (Step S66 (time t66)). The packet decoder 41-3 decodes the SPI data packet and passes the decoded SPI data block (O_DB #1) to the SPI block 41-1.

The controller 41-1-4 in the SPI block 41-1 of the S_SerDes 41 asserts a CS (S_CS) indicating to the SPI/Slave 12 that SPI communication for transferring the SPI data block (O_DB #1) starts (Step S67 (time t67)). How long to assert is determined on the basis of an SPI transmission mode included in the SPI data packet, the data size (N bytes) of the SPI data block, and information regarding the number of SPI data blocks used in one SPI communication.

The SPI block 41-1 of the S_SerDes 41 causes the SPI/Slave 12 to start the output of the SCK (S_SCK) of the SPI for transferring the SPI data block (O_DB #1) (Step S68 (time t68)). Reproduction is performed using SCK frequency information included in the SPI data packet, and the same frequency as that of the SCK (M_SCK) on the SPI/Master 11 side is used.

The SPI block 41-1 of the S_SerDes 41 outputs an N-byte SPI data block (O_DB #1) to the SPI/Slave 12 in synchronization with the SCK (Step S69 (time t69)). At this time, the SPI mode is determined on the basis of SPI mode information included in the SPI data packet.

The SPI/Slave 12 synchronizes SPI read data (I_DB #1) with the SCK (S_SCK) at the same time, and outputs the SPI read data of N bytes which is the same as write data (O_DB #1) (Step S70 (time t70)).

The S_SerDes 41 temporarily holds the received N-byte SPI read data (I_DB #1) in the buffer/memory 41-1-2 (Step S71 (time t71)). After holding the N-byte SPI data block (I_DB #1), the buffer/memory 41-1-2 transfers the encapsulated SPI data packet (I_DB #1) via the packet encoder 41-2 that performs encapsulation processing for transmitting the SPI data during the first incoming downlink TDD burst period allocated for transmitting the first SPI data scheduled by the DLL (the DLL 41-4 of FIG. 8). The S_SerDes 41 transmits the downlink packet to the M_SerDes 31 via the cable 103.

The M_SerDes 31 decodes the downlink packet including the received SPI data block (I_DB #1) via the PHY 31-5 and the DLL 31-4, and supplies the SPI data packet to the packet decoder 31-3 (Step S72 (time t72)). The packet decoder 31-3 decodes the SPI data packet and passes the decoded SPI data block (I_DB #1) to the SPI block 31-1 (31-*f* in FIG. 9).

The buffer/memory 31-1-2 in the SPI block 31-1 temporarily holds the SPI data block (I_DB #1) (Step S73 (time t73)).

The RTC 31-7 measures a time width 4D by using the SCK with a time point when the buffer/memory 31-1-2 records the last data in the SPI data block (O_DB #1) as a starting point (31-*a* in FIG. 9) (Step S74 (time t74)). The buffer/memory 31-1-2 starts outputting an N-byte SPI data block (O_DB #1) in synchronization with the SCK, with the next SCK of which the time width 4D has been measured by the RTC 31-7 using the SCK, that is, an output start time point (31-*g*) of SPI write data (O_DB #6) output by the SPI/Master 11 as a starting point (Step S75 (time t75)).

The SPI/Master 11 sequentially reads N bytes of the SPI data block (I_DB #1) from the SPI/Slave 12 in synchronization with the SCK (Step S76 (time t76)).

The SPI/Master 11 outputs the write data (O_DB #6) at the same time. Since the M_SerDes 31 knows the number of SPI data blocks (four in this example) to be transmitted in this SPI communication in a processing procedure performed before the processing of Step S61, these SPI data blocks are discarded without performing processing for outputting the SPI data blocks after the write data (O_DB #5) (Step S77 (time t77)).

In the processing procedure so far, the SPI/Master 11 completes the writing of the first SPI data block (O_DB #1) to the SPI/Slave 12 and the reading of the SPI data block (I_DB #1) from the SPI/Slave 12 without using an interrupt signal.

The SPI/Master 11 outputs the next SPI data block (O_DB #2) following the first SPI data block (O_DB #1), and sequentially outputs the SPI data blocks to be transmitted (Step S78 (time t78)). However, the SPI data blocks transmitted to the SPI/Slave 12 are (O_DB #1 to O_DB #4), and SPI data blocks after O_DB #4 are dummy data accompanying processing for reading the read data from the SPI/Slave 12. Thereafter, the same processing as in Steps S63 to S78 is performed on each of the SPI data blocks (O_DB #2, 0 DB #3, and O_DB #4). In the second embodiment, the first SPI data block (O_DB #1) transmitted from the SPI/Master 11 is transmitted without causing the processing delay time L in the M_SerDes 31, so that the following different processing is required.

The buffer/memory 31-1-2 temporarily holds the SPI data block (I_DB #X) sequentially input from the SPI/Master 11, and outputs the SPI data block (I_DB #X) to the uplink allocated to transmit the SPI data via the ECP 31-2. However, since the SPI data (in this case, O_DB #3) is not completely accumulated in the buffer/memory 31-1-2 at a timing of the uplink TDD burst period, the ECP 31-2 sets a flag (C-7 in FIG. 10) indicating that the SPI data is not included to be invalid, and outputs the flag to the DLL 31-4 (Step S79 (time t79)). The DLL 31-4 and the PHY 31-5 output an SPI packet that does not include the SPI data to the cable 103 as an uplink packet.

Once the S_SerDes 41 analyzes the received uplink SPI packet with the DCP 41-3, detects an empty flag (invalid C-7 in FIG. 10), and thus knows that the SPI data is not included, the S_SerDes 41 transmits the information to the controller 41-1-4 in the SPI block 41-1, and the controller 41-1-4 stops the operation of the SCK generator 41-1-3 and stops the output of the SCK (Step S80 (time t80)). Accordingly, the SPI communication between the S_SerDes 41 and the SPI/Slave 12 is temporarily stopped.

Once the S_SerDes 41 receives the uplink packet including the SPI data block (O_DB #3), the DCP 41-3 performs analysis to recognize that the SPI data is included, and the S_SerDes 41 resumes the SPI communication and transmits the information to the controller 41-1-4 in the SPI block 41-1 (Step S81 (time t81)).

The controller 41-1-4 resumes the operation of the SCK generator 41-1-3 and starts the output of the SCK (Step S82 (time t82)).

The processing of Step S69 to the processing of Step S78 are sequentially performed for each of the SPI data blocks (O_DB #3 and O_DB #4) and (I_DB #3 and I_DB #4) (Step S83 (time t83)).

The controller 41-1-4 in the SPI block 41-1 of the S_SerDes 41 stops the output of S_SCK to notify the SPI/Slave 12 that the SPI communication is to be terminated after receiving the SPI data as many as the number of blocks (four blocks in this example) described in the SPI data packet (Step S84 (time t84)).

Further, the SPI communication between the S_SerDes 41 and the SPI/Slave 12 is terminated by deasserting S_CS (Step S85 (time t85)).

The SPI/Master 11 outputs the SCK as many as the number (4+5=9 in this example) obtained by adding, to the number of SPI data blocks (four in this example) read from the SPI/Slave 12, the number of five SPI data blocks which is a processing delay time regardless of the phase relationship between the SPI communication start timing and the TDD burst period to continue the read processing up to the SPI data block (I_DB #4), and after the read processing is terminated, the SPI/Master 11 deasserts M_CS to terminate the SPI communication (Step S86 (time t86)).

As described above, the M_SerDes 31 that has received the SPI data block from the SPI/Master 11 transmits the uplink packet including the received SPI data block to the S_SerDes 41 before the TDD frame period L elapses. Therefore, the SPI data block from the SPI/Master 11 can be quickly transmitted to the SPI/Slave 12. Since the S_SerDes 41 does not supply a clock to the shift register in a case where the uplink packet from the M_SerDes 31 does not arrive, the shift register can be operated in accordance with a timing when the uplink packet arrives from the M_SerDes 31, so that power consumption can be reduced.

Note that the present technology can have the following configuration.

(1) A communication device including:

a communication unit that adds, to a set of data blocks including a serial signal group conforming to a serial peripheral interface (SPI) transmitted from a master in synchronization with a clock, identification information for identifying the data blocks, and transmits the data blocks to a communication partner device within one frame period of a predetermined communication protocol, or adds, to a plurality of data blocks each including a part of the serial signal group, identification information for identifying each of the plurality of data blocks, and transmits the plurality of data blocks to the communication partner device in a plurality of frame periods; and a storage unit that sequentially stores a predetermined number of data blocks transmitted from the master and then outputs a data block transmitted from a slave via the communication partner device in response to the predetermined number of data blocks from the master and stored, to transmit the data block to the master, the predetermined number being one or more.

(2) The communication device according to (1), in which the predetermined number of data blocks are transmitted to the communication partner device in the predetermined number of frame periods.

(3) The communication device according to (1) or (2), in which the predetermined number of data blocks are a predetermined number of continuous data blocks corresponding to information regarding a total number of the data blocks included in the serial signal group transmitted from the master.

(4) The communication device according to any one of (1) to (3), further including:

a first counter that measures a length of the frame period on the basis of a reference clock shared between the master and the slave; and a second counter that counts the number of data blocks transmitted from the master, in which the storage unit sequentially stores the predetermined number of data blocks at a timing corresponding to count values of the first counter and the second counter, and then outputs the stored data block from the communication partner device.

(5) The communication device according to (4), in which the reference clock is a clock of a frequency defined by an Automotive SerDes Alliance (ASA) specification, and the second counter performs a counting operation in synchronization with a clock included in the serial signal group conforming to the SPI.

(6) The communication device according to any one of (1) to (5), in which a first period which is a cycle in which the predetermined number of data blocks transmitted from the master are stored in the storage unit is equal to or longer than a second period which is a cycle in which the communication unit transmits a packet including the data block to the communication partner device.

(7) The communication device according to (6), in which the second period is longer than a half of the first period.

(8) The communication device according to (6) or (7), in which the communication unit transmits the data block stored in the storage unit to the communication partner device in the frame period after the second period elapses from when the data block transmitted from the master is stored in the storage unit.

(9) The communication device according to (6) or (7), in which the communication unit transmits the data block stored in the storage unit to the communication partner device in the frame period before the second period elapses from when the data block transmitted from the master is stored in the storage unit.

(10) The communication device according to (9), in which in a case where a data block to be transmitted to the communication partner device is not ready, the communication unit stops transmitting the data block to the communication partner device until a next frame period.

(11) The communication device according to (10), in which in a case where the data block from the communication partner device does not arrive for the data block from the master, the storage unit stops storing a new data block until a next frame period.

(12) The communication device according to any one of (6) to (11), further including a shift register that sequentially stores the predetermined number of data blocks transmitted from the master in the storage unit every first period, and then sequentially reads data blocks transmitted from the communication partner device and stored in the storage unit every first period from the storage unit and transmits the data blocks to the master.

(13) The communication device according to (12), in which the shift register sequentially reads the data blocks from the communication partner device stored in the storage unit and transmits the data blocks to the master without transmitting an interrupt signal indicating that a data block from the communication partner device has arrived to the master.

(14) The communication device according to any one of (1) to (13), in which the communication unit transmits a data block from the master to the communication partner device and receives a data block from the communication partner device in mutually different periods within the frame period by using the communication protocol according to time division duplex (TDD).

(15) A communication system including:

a first communication device and a second communication device that transmit and receive a packet according to a predetermined communication protocol, in which the first communication device includes: a first communication unit that adds, to a set of data blocks including a serial signal group conforming to a serial peripheral interface (SPI) transmitted from a master in synchronization with a clock, identification information for identifying the data blocks, and transmits the data blocks to a second communication device within one frame period of the predetermined communication protocol, or adds, to a plurality of data blocks each including a part of the serial signal group, identification information for identifying each of the plurality of data blocks, and transmits the plurality of data blocks to the second communication device in a plurality of frame periods; and a first storage unit that sequentially stores a predetermined number of data blocks transmitted from the master and then stores data blocks transmitted from a slave via the second communication device in response to the predetermined number of data blocks from the master, the predetermined number being one or more, and the second communication device includes a second communication unit that transmits data blocks transmitted from the slave in response to the predetermined number of data blocks transmitted from the first communication unit to the first communication device within at least one frame period.

(16) The communication system according to (15), in which the first communication device further includes a first shift register that sequentially stores the predetermined number of data blocks transmitted from the master in the first storage unit and then sequentially reads the data blocks transmitted from the second communication device and stored in the first storage unit from the first storage unit and transmits the data blocks to the master, and the second communication device further includes:

a second storage unit that stores the predetermined number of data blocks transmitted from the first communication unit and stores the data blocks transmitted from the slave; and a second shift register that sequentially stores the predetermined number of data blocks transmitted from the first communication unit in the second storage unit, sequentially reads the data blocks transmitted from the slave and stored in the second storage unit from the second storage unit, and transmits the data blocks to the first communication unit via the second communication unit.

(17) The communication system according to (16), in which the second shift register stops a shift operation in a case where there are no data block to be stored in the second storage unit and no data block to be transmitted to the first communication unit.

(18) The communication system according to (17), further including a clock generator that generates a clock that causes the second shift register to perform the shift operation in a case where the second communication unit receives the data block to be stored in the second storage unit.

(19) The communication system according to (18), in which the clock is in synchronization with a serial clock included in the serial signal group conforming to the SPI transmitted from the master to the first communication device.

(20) A communication method including:

adding, to a set of data blocks including a serial signal group conforming to a serial peripheral interface (SPI) transmitted from a master in synchronization with a clock, identification information for identifying the data blocks, and transmitting the data blocks to a communication partner device within one frame period of a predetermined communication protocol, or adding, to a plurality of data blocks each including a part of the serial signal group, identification information for identifying each of the plurality of data blocks, and transmitting the plurality of data blocks to the communication partner device in a plurality of frame periods; and sequentially storing, in a storage unit, a predetermined number of data blocks transmitted from the master and then reading a data block transmitted from a slave via the communication partner device in response to the predetermined number of data blocks from the master and stored in the storage unit, to transmit the data block to the master, the predetermined number being one or more. Aspects of the present disclosure are not limited to the respective embodiments described above, but include various modifications that can be conceived by those skilled in the art, and the effects of the present disclosure are not limited to the above-described contents. That is, various additions, changes, and partial deletions can be made without departing from the conceptual idea and spirit of the present disclosure derived from the contents defined in the claims and equivalents thereof.

REFERENCE SIGNS LIST

1a Communication device
1b Communication device
2 Communication system
11 SPI/Master
11-1 Shift register
11-2 Buffer/memory
11-3 Controller
11-4 SCK generator
12-1 Shift register
12-2 Buffer/memory
31 M_SerDes
31-1 SPI block
31-1-1 Shift register
31-1-2 Buffer/memory
31-2 Packet encoder
31-3 Packet decoder
31-5 PHY
31-6 PTB counter
31-7 RTC counter
32 Peripheral device
41 S_SerDes
41-1 SPI block
41-1-1 Shift register
41-1-2 Buffer/memory
41-1-3 SCK generator 41-1-4 Controller
41-2 Packet encoder
41-3 Packet decoder
41-5 PHY
103 Cable

The invention claimed is:

1. A communication device comprising:
a communication unit that adds identification information to data blocks including a serial signal group conforming to a serial peripheral interface (SPI), the data blocks transmitted from a master in synchronization with a clock, the identification information identifying the data blocks, and that transmits the data blocks to a communication partner device within one frame period of a predetermined communication protocol, or that transmits the data blocks to the communication partner device in a plurality of frame periods; and
a storage unit that sequentially stores a predetermined number oft the data blocks transmitted from the master and then outputs an other data block transmitted from a slave via the communication partner device in response to storing the predetermined number of the data blocks from the master, to transmit the other data block to the master, the predetermined number being one or more.

2. The communication device according to claim 1, wherein
the predetermined number of the data blocks are transmitted to the communication partner device in a predetermined number of frame periods.

3. The communication device according to claim 1, wherein
the predetermined number of the data blocks are a predetermined number of continuous data blocks corresponding to information regarding a total number of the data blocks included in the serial signal group transmitted from the master.

4. The communication device according to claim 1, further comprising:
a first counter that measures a length of the frame period on a basis of a reference clock shared between the master and the slave; and
a second counter that counts the number of the data blocks transmitted from the master, wherein
the storage unit sequentially stores the predetermined number of the data blocks at a timing corresponding to count values of the first counter and the second counter, and then outputs the other data block.

5. The communication device according to claim 4, wherein
the reference clock is a clock of a frequency defined by an Automotive SerDes Alliance (ASA) specification, and
the second counter performs a counting operation in synchronization with a clock included in the serial signal group conforming to the SPI.

6. The communication device according to claim 1, wherein
a first period which is a cycle in which the predetermined number of the data blocks transmitted from the master are stored in the storage unit is equal to or longer than a second period which is a cycle in which the communication unit transmits a packet including the other data block to the communication partner device.

7. The communication device according to claim 6, wherein
the second period is longer than a half of the first period.

8. The communication device according to claim 6, wherein
the communication unit transmits the other data block stored in the storage unit to the communication partner device in the frame period after the second period elapses from when the predetermined number of the data blocks transmitted from the master are stored in the storage unit.

9. The communication device according to claim 6, wherein
the communication unit transmits the other data block stored in the storage unit to the communication partner device in the frame period before the second period elapses from when the predetermined number of the data blocks transmitted from the master are stored in the storage unit.

10. The communication device according to claim 9, wherein
in a case where a given data block to be transmitted to the communication partner device is not ready, the communication unit stops transmitting the given data block to the communication partner device until a next frame period.

11. The communication device according to claim 10, wherein
in a case where the given data block from the communication partner device does not arrive, the storage unit delays storing the given data block until a next frame period.

12. The communication device according to claim 6, further comprising
a shift register that sequentially stores the predetermined number of the data blocks transmitted from the master in the storage unit every first period, and then sequentially reads data blocks transmitted from the communication partner device and stored in the storage unit every first period from the storage unit and transmits the data blocks to the master.

13. The communication device according to claim 12, wherein
the shift register sequentially reads the data blocks from the communication partner device stored in the storage unit and transmits the data blocks to the master without transmitting an interrupt signal indicating that a data block from the communication partner device has arrived to the master.

14. The communication device according to claim 1, wherein
the communication unit transmits a data block from the master to the communication partner device and receives a data block from the communication partner device in mutually different periods within the frame period by using the communication protocol according to time division duplex (TDD).

15. A communication system comprising:
a first communication device and a second communication device that transmit and receive a packet according to a predetermined communication protocol, wherein
the first communication device includes:
a first communication unit that adds identification information to data blocks including a serial signal group conforming to a serial peripheral interface (SPI) transmitted from a master in synchronization with a clock, the identification information identifying the data blocks, and that transmits the data blocks to a second communication device within one frame period of the predetermined communication protocol, or that transmits the data blocks to the second communication device in a plurality of frame periods; and a first storage unit that sequentially stores a predetermined number of the data blocks transmitted from the master and then stores other data blocks transmitted from a slave via the second communication device in response to the predetermined number of data blocks from the master, the predetermined number being one or more, and the second communication device includes a second communication unit that transmits the other data blocks transmitted from the slave in response to the predetermined number of the data blocks transmitted from the first communication unit to the first communication device within at least one frame period.

16. The communication system according to claim 15, wherein the first communication device further includes a first shift register that sequentially stores the predetermined number of the data blocks transmitted from the master in the first storage unit and then sequentially reads the other data blocks transmitted from the second communication device and stored in the first storage unit from the first storage unit and transmits the other data blocks to the master, and the second communication device further includes:

a second storage unit that stores the predetermined number of the data blocks transmitted from the first communication unit and stores the other data blocks transmitted from the slave; and a second shift register that sequentially stores the predetermined number of that data blocks transmitted from the first communication unit in the second storage unit, sequentially reads the other data blocks transmitted from the slave and stored in the second storage unit from the second storage unit, and transmits the other data blocks to the first communication unit via the second communication unit.

17. The communication system according to claim 16, wherein the second shift register stops a shift operation in a case where there are no data blocks to be stored in the second storage unit and no other data blocks to be transmitted to the first communication unit.

18. The communication system according to claim 17, further comprising a clock generator that generates a clock that causes the second shift register to perform the shift operation in a case where the second communication unit receives the other data block to be stored in the second storage unit.

19. The communication system according to claim 18, wherein the clock is in synchronization with a serial clock included in the serial signal group conforming to the SPI transmitted from the master to the first communication device.

20. A communication method comprising:

adding identification information to data blocks including a serial signal group conforming to a serial peripheral interface (SPI) transmitted from a master in synchronization with a clock, the identification information identifying the data blocks, and transmitting the data blocks to a communication partner device within one frame period of a predetermined communication protocol, or transmitting the data blocks to the communication partner device in a plurality of frame periods; and sequentially storing, in a storage unit, a predetermined number of the data blocks transmitted from the master and then reading an other data block transmitted from a slave via the communication partner device in response to storing the predetermined number of the data blocks from the master, to transmit the other data block to the master, the predetermined number being one or more.

21. A non-transitory computer readable medium storing program code for communication, the program code being executable by a processor to perform operations comprising:

adding identification information to data blocks including a serial signal group conforming to a serial peripheral interface (SPI) transmitted from a master in synchronization with a clock, the identification information identifying the data blocks, and transmitting the data blocks to a communication partner device within one frame period of a predetermined communication protocol, or transmitting the data blocks to the communication partner device in a plurality of frame periods; and sequentially storing a predetermined number of the data blocks transmitted from the master and then reading an other data block transmitted from a slave via the communication partner device in response to storing the predetermined number of the data blocks from the master, to transmit the other data block to the master, the predetermined number being one or more.

* * * * *